United States Patent
Hosoya

(10) Patent No.: US 8,519,398 B2
(45) Date of Patent: Aug. 27, 2013

(54) DISPLAY DEVICE

(75) Inventor: Kunio Hosoya, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/423,874

(22) Filed: Mar. 19, 2012

(65) Prior Publication Data

US 2012/0176576 A1    Jul. 12, 2012

Related U.S. Application Data

(63) Continuation of application No. 12/413,717, filed on Mar. 30, 2009, now Pat. No. 8,138,500.

(30) Foreign Application Priority Data

Mar. 31, 2008    (JP) .................................. 2008-089241

(51) Int. Cl.
*H01L 29/10* (2006.01)
*H01L 27/14* (2006.01)
*G02F 1/1333* (2006.01)

(52) U.S. Cl.
USPC ......... 257/59; 257/72; 257/E27.001; 349/138

(58) Field of Classification Search
CPC ... H01L 25/0753; H01L 33/63; H01L 27/153; G02F 1/133377; G02F 1/133345
USPC ................ 257/59, 72, 88, E27.001; 349/38, 349/42, 43, 84, 138, 139
See application file for complete search history.

(56) References Cited

U.S. PATENT DOCUMENTS

| | | | |
|---|---|---|---|
| 4,409,134 | A | 10/1983 | Yamazaki |
| 5,054,887 | A | 10/1991 | Kato et al. |
| 5,233,448 | A | 8/1993 | Wu |
| 5,483,082 | A | 1/1996 | Takizawa et al. |
| 5,580,796 | A | 12/1996 | Takizawa et al. |
| 6,580,475 | B2 | 6/2003 | Yamazaki et al. |
| 6,759,313 | B2 | 7/2004 | Yamazaki et al. |
| 6,774,398 | B2 | 8/2004 | Jang et al. |
| 6,784,949 | B1 | 8/2004 | Nagata et al. |
| 6,825,488 | B2 | 11/2004 | Yamazaki et al. |
| 6,953,951 | B2 | 10/2005 | Yamazaki et al. |
| 7,023,021 | B2 | 4/2006 | Yamazaki et al. |
| 7,084,019 | B2 | 8/2006 | Yamazaki et al. |
| 7,250,991 | B2 | 7/2007 | Nagata et al. |
| 7,459,352 | B2 | 12/2008 | Yamazaki et al. |

(Continued)

FOREIGN PATENT DOCUMENTS

| | | |
|---|---|---|
| EP | 0 376 437 A2 | 7/1990 |
| EP | 1 037 095 A2 | 9/2000 |

(Continued)

*Primary Examiner* — Nikolay Yushin
(74) *Attorney, Agent, or Firm* — Husch Blackwell LLP

(57) ABSTRACT

In a pixel portion, a scan signal line and an auxiliary capacitor line are formed using a second conductive film, and a data signal line is formed using a first conductive film. In a TFT portion, a gate electrode is formed using the first conductive film and electrically connected to the scan signal line formed using the second conductive film through an opening in a gate insulating film. Further, a source electrode and a drain electrode are formed using the second conductive film. In the auxiliary capacitor portion, the auxiliary capacitor line formed using the second conductive film serves as a lower electrode, the pixel electrode serves as an upper electrode, and the passivation film used as a dielectric film is interposed between the capacitor electrodes.

18 Claims, 15 Drawing Sheets

(56) References Cited

U.S. PATENT DOCUMENTS

| | | |
|---|---|---|
| 8,134,156 B2 | 3/2012 | Akimoto |
| 8,368,079 B2 | 2/2013 | Akimoto |
| 2001/0017372 A1 | 8/2001 | Koyama |
| 2002/0001048 A1 | 1/2002 | Lee et al. |
| 2004/0119897 A1 | 6/2004 | Jang et al. |
| 2006/0273317 A1 | 12/2006 | Yamazaki et al. |
| 2007/0035676 A1 | 2/2007 | Hosoya |
| 2007/0054441 A1 | 3/2007 | Hsu et al. |
| 2007/0109470 A1 | 5/2007 | Hosoya |
| 2009/0146149 A1 | 6/2009 | Yamazaki et al. |
| 2009/0186437 A1 | 7/2009 | Akimoto |
| 2009/0186445 A1 | 7/2009 | Akimoto |
| 2009/0189155 A1 | 7/2009 | Akimoto |
| 2009/0189156 A1 | 7/2009 | Akimoto |
| 2010/0003783 A1 | 1/2010 | Akimoto |

FOREIGN PATENT DOCUMENTS

| | | |
|---|---|---|
| JP | 1-101519 | 4/1989 |
| JP | 2-48639 | 2/1990 |
| JP | 4-51140 | 2/1992 |
| JP | 5-289111 | 11/1993 |
| JP | 6-202153 | 7/1994 |
| JP | 7-28089 | 1/1995 |
| JP | 9-54342 | 2/1997 |
| JP | 11-15022 | 1/1999 |
| JP | 2000-323698 | 11/2000 |
| JP | 2002-14628 | 1/2002 |
| JP | 2002-182237 | 6/2002 |

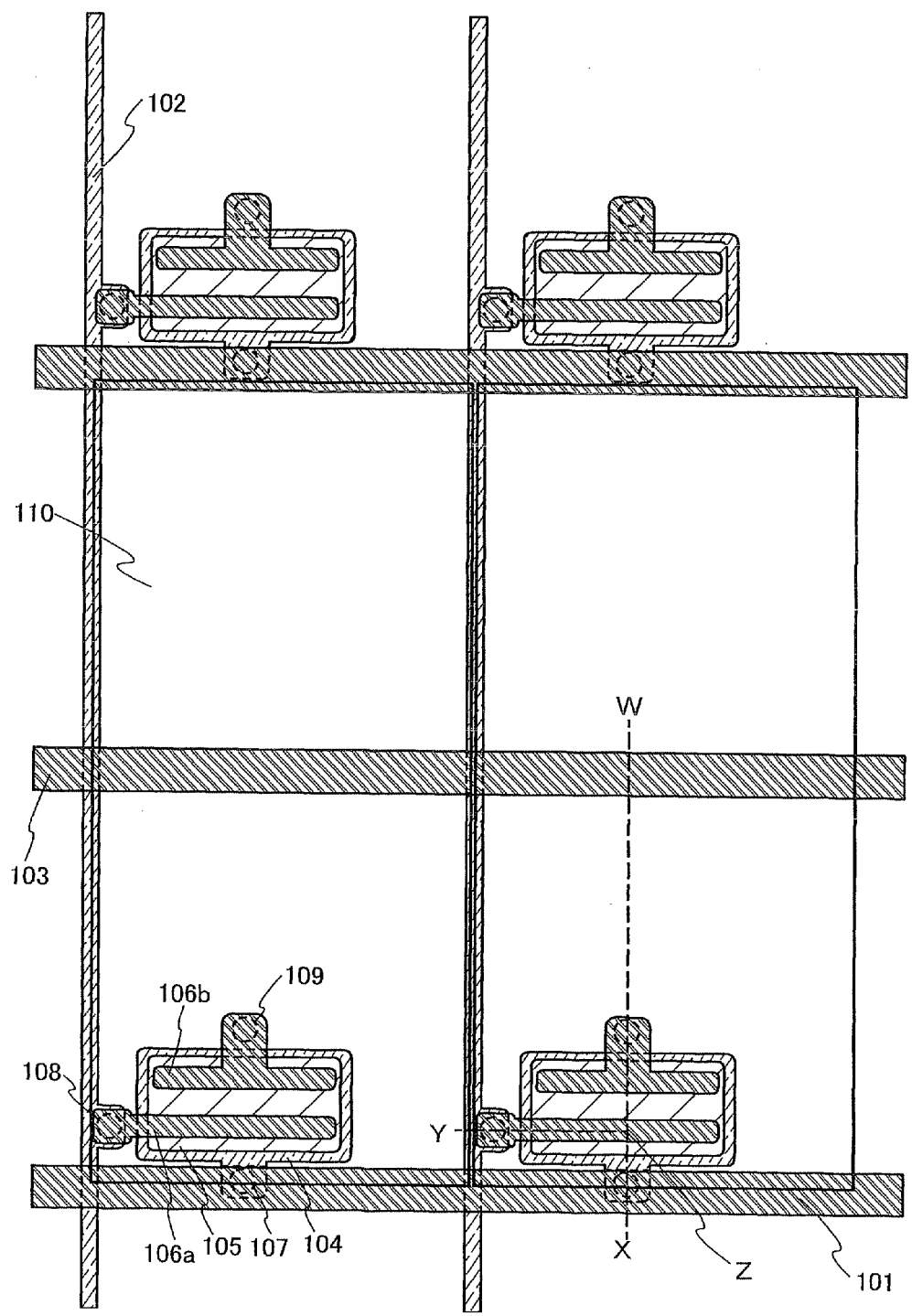

DISPLAY DEVICE

This application is a continuation of application Ser. No. 12/413,717 filed on Mar. 30, 2009 now U.S. Pat. No. 8,138,500.

BACKGROUND OF THE INVENTION

1. Field of the Invention

The present invention relates to a display device using a thin film transistor at least in a pixel portion and a method for manufacturing the display device, and specifically relates to a display device having a pixel portion with a high aperture ratio and a method for manufacturing the display device.

2. Description of the Related Art

In recent years, a large liquid crystal module with a diagonal of greater than or equal to 30 inches or 40 inches has been actively developed for use as display devices such as liquid crystal televisions. In particular, demand for high definition panels for full high-definition (FHD) television or the like is high. A variety of characteristics such as high speed response corresponding to a speed of displaying a moving picture, excellent color reproducibility, sufficient luminance, and a high viewing angle in addition to high definition described above are needed especially in a liquid crystal module for use as liquid crystal televisions.

Conventionally, as the liquid crystal module for liquid crystal televisions, an active matrix module in which a plurality of pixels each having a thin film transistor (hereinafter, referred to as a TFT) using amorphous silicon as an active element are arranged has been used. In particular, the TFT generally has an inversed staggered structure which is suitable for mass production. In an element substrate having such an inversed staggered amorphous silicon TFT, a conductive film which is first deposited over the substrate (hereinafter, referred to as a first conductive film) has been used as a scan signal line (also referred to as a gate wiring), and a conductive film which is formed over a gate insulating film (hereinafter, referred to as a second conductive film) has been used as a data signal line (also referred to as a source wiring). The scan signal line is provided in a horizontal direction with respect to the substrate surface and the data signal line is provided in a vertical direction with respect to the substrate surface.

In a pixel structure of a conventional active matrix display device, an auxiliary capacitor portion which holds a data signal for one frame period (also referred to as an additional capacitor or a storage capacitor) is provided. The auxiliary capacitor portion has employed either a mode in which the first conductive film to be an auxiliary capacitor line and a light-transmitting conductive film to be a pixel electrode formed as an uppermost layer each serve as a capacitor electrode (see Patent Document 1: Japanese Published Patent Application No. H2-48639), or a mode in which the first conductive film to be an auxiliary capacitor line and the second conductive film connected to a light-transmitting conductive film each serve as a capacitor electrode (see Patent Document 2: Japanese Published Patent Application No. H6-202153). The auxiliary capacitor line is provided in parallel to the scan signal line. In either mode, the auxiliary capacitor portion is formed in the same manufacturing process in which formation from an inverted staggered TFT to a pixel electrode is performed, and suppression of increase in the number of steps is a basic purpose of the auxiliary capacitor portion.

A bridge structure is disclosed in which most of a gate wiring and a source wiring which perpendicularly intersect with each other are formed using the first conductive film, and the source wiring which is divided at an intersection of the gate wiring and the source wiring are connected using the second conductive film which crosses the gate wiring (see Patent Document 3: Japanese Published Patent Application No. H1-101519). In addition, a structure is disclosed in which a pixel electrode formed using indium tin oxide (ITO) is formed over a gate insulating film and a counter electrode formed using indium tin oxide (ITO) is formed with a passivation film interposed therebetween to form an auxiliary capacitor portion (See Patent Document 4: Japanese Published Patent Application No. H5-289111).

SUMMARY OF THE INVENTION

In the structure of the Patent Document 1, a stacked layer of a gate insulating film, a passivation film, and an anodized film is used as a dielectric film between the capacitor electrodes. Since the total thickness of the gate insulating film, the passivation film, and the anodized film is the thickness of the dielectric film in this case, the whole dielectric film is thick. Accordingly, electrostatic capacitance which can be held becomes small. Therefore, the area of the auxiliary capacitor portion needs to be large; however, the increase in the area of the auxiliary capacitor portion leads to reduction in an aperture ratio of a pixel portion, which is not preferable.

In the structure of the Patent Document 2, a single-layer gate insulating film is used as the dielectric film of the auxiliary capacitor portion, so that the thickness of the dielectric film can be smaller than that of Patent Document 1. However, the thickness of the gate insulating film is generally larger than that of the passivation film. The thickness of the gate insulating film is designed, placing highest priority on electric characteristics of a TFT, and designed in consideration of the electric characteristics of a TFT, the withstand voltage of the gate insulating film, or the like. Therefore, the area or the like of the auxiliary capacitor portion is designed, secondarily in accordance with the thickness of the gate insulating film that is designed to obtain a desired TFT so as to form a desired auxiliary capacitor portion.

Accordingly, for a higher aperture ratio of the pixel portion, it is ideal to use only a passivation film which can have the smallest thickness as a dielectric film of the auxiliary capacitor portion. However, in the conventional pixel structure typified by the Patent Documents 1 and 2, the data signal line to be provided in a vertical direction with respect to the substrate surface is formed using the second conductive film; therefore, it is impossible to form the auxiliary capacitor line in a horizontal direction so as to cross the data signal line using the second conductive film. Accordingly, in the conventional pixel structure, it is difficult to use a light-transmitting film and the second conductive film as capacitor electrodes and form an auxiliary capacitor portion in which only a passivation film is used as a dielectric film.

Then, a structure in the Patent Document 3 is given in which most of the gate wiring and the source wiring are formed using the first conductive film, and the source wiring which is divided at an intersection of the gate wiring and the source wiring is connected using the second conductive film. Although not described in the Patent Document 3, the auxiliary capacitor line formed using the second conductive film can be arranged in a horizontal direction with respect to a substrate; therefore, an auxiliary capacitor portion in which only a passivation film is used as a dielectric film can be formed. However, due to the use of a bridge structure in which the source wiring which is divided at an intersection of the gate wiring and the source wiring is connected using the second conductive film which crosses the gate wiring, the data signal line is not formed using one conductive film. That is, another conductive film is needed for connection, which leads to increase in contact resistance. Since two contacts are formed in each pixel in the row direction, wiring resistance is significantly increased especially in a large panel with a diagonal of greater than or equal to 30 inches, which causes signal delay. Further, if poor contact occurs even in a single contact in the data signal line, all the pixels which are located ahead of the poor contact portion in a column connected to the data signal line have defects. A so-called line defect occurs, which lowers reliability.

In the structure in the Patent Document 4, an auxiliary capacitor portion which has a pixel electrode of a lower electrode, a counter electrode of an upper electrode, and a dielectric film in which a passivation film is used can be formed. However, the passivation film as well as liquid crystal is included between the pixel electrode and the common electrode; therefore, variation in electric filed applied to the liquid crystal is caused, which results in decrease in image quality.

In view of the above-described problems, it is an object of an embodiment of the present invention to provide a highly-reliable display device having a pixel with a high aperture ratio. In addition, it is another object of an embodiment of the present invention to manufacture a display device with a high aperture ratio at low cost.

In order to achieve the above objects, one embodiment of the present invention is that in a pixel portion, a scan signal line and an auxiliary capacitor line are formed using a second conductive film, and a data signal line is formed using a first conductive film. In a TFT portion, a gate electrode is formed using the first conductive film and electrically connected to the scan signal line formed using the second conductive film through an opening in a gate insulating film. Further, a source electrode and a drain electrode are formed using the second conductive film. Further, one of the source electrode and the drain electrode is electrically connected to the data signal line formed using the first conductive film through the opening in the gate insulating film. The other of the source electrode and the drain electrode is connected to a pixel electrode formed using a light-transmitting conductive film through an opening in a passivation film and a planarization film. Further, the pixel electrode is arranged so as to overlap with the scan signal line 101 and the data signal line 102 in a peripheral edge portion. In the auxiliary capacitor portion, the auxiliary capacitor line formed using the second conductive film serves as a lower electrode, the pixel electrode serves as an upper electrode, and only the passivation film used as a dielectric film is interposed between the capacitor electrodes.

Further, another embodiment of the present invention is that in order to form an opening in the passivation film and the planarization film, where the source electrode or the drain electrode is connected to the pixel electrode, and an opening in the planarization film in the auxiliary capacitor portion at the same time using one photomask, photolithography is performed using a multi-tone mask.

Another embodiment of the present invention is a display device including a gate electrode which is formed using a first conductive film over a light-transmitting substrate; a data signal line which is formed using the first conductive film and extends in one direction; a first insulating film which is provided over the first conductive film; a semiconductor film which is provided over the first insulating film; a source electrode and a drain electrode which are formed using a second conductive film over the first insulating film and the semiconductor film; a scan signal line which is formed using the second conductive film and extends in a direction intersecting with the one direction; an auxiliary capacitor line which is formed using the second conductive film and extends in a direction intersecting with the one direction; a second insulating film which is provided over the second conductive film; a third insulating film which is provided over the second insulating film; and a pixel electrode which is provided over the third insulating film and overlaps with the data signal line, the scan signal line, or the auxiliary capacitor line in a peripheral edge portion. In the display device, one of the source electrode and the drain electrode is electrically connected to the semiconductor film and the data signal line; the other of the source electrode and the drain electrode is electrically connected to the semiconductor film and the pixel electrode; the gate electrode is electrically connected to the scan signal line; and the auxiliary capacitor line as well as the pixel electrode is included in the auxiliary capacitor portion where the second insulating film is used as a dielectric film.

Another embodiment of the present invention is a display device including a gate electrode which is formed using a first conductive film over a light-transmitting substrate; a data signal line which is formed using the first conductive film and extends in one direction; a first insulating film which is provided over the first conductive film; a microcrystalline semiconductor film which is provided over the first insulating film; a buffer layer which is provided over the microcrystalline semiconductor film and has a portion that is recessed when seen in cross section; a first impurity semiconductor film and a second impurity semiconductor film, to which an impurity element imparting one conductivity type is added, and which are provided over the buffer layer; a source electrode and a drain electrode which are formed using a second conductive film which is formed over the first insulating film, the first impurity semiconductor film and the second impurity semiconductor film; a scan signal line which is formed using the second conductive film and extends in a direction intersecting with the one direction; an auxiliary capacitor line which is formed using the second conductive film and extends in a direction intersecting with the one direction; a second insulating film which is provided over the second conductive film; a third insulating film which is provided over the second insulating film; and a pixel electrode which is provided over the third insulating film and overlaps with the data signal line, the scan signal line, or the auxiliary capacitor line in a peripheral edge portion. In the display device, one of the source electrode and the drain electrode is electrically connected to the first impurity semiconductor film and the data signal line; the other of the source electrode and the drain electrode is electrically connected to the second impurity semiconductor film and the pixel electrode; the gate electrode is electrically connected to the scan signal line; and the auxiliary capacitor line as well as the pixel electrode is included in the auxiliary capacitor portion where the second insulating film is used as a dielectric film.

Note that the above-described semiconductor film preferably has a portion that is recessed when seen in cross section. Further, over the semiconductor film, the first impurity semiconductor film and the second impurity semiconductor film, to which the impurity element imparting one conductivity type is added, are provided. It is preferable that one of the source electrode and the drain electrode be electrically connected to the first impurity semiconductor film, the semiconductor film, and the data signal line and that the other of the source electrode and the drain electrode be electrically connected to the second impurity semiconductor film, the semiconductor film, and the pixel electrode.

Note that it is preferable that the third insulating film be formed using a photosensitive organic resin material.

Note that it is preferable that the data signal line and the auxiliary capacitor line intersect with each other with the first insulating film interposed therebetween.

Another embodiment of the present invention is a method for manufacturing a display device including the steps of forming a gate electrode and a data signal line using a first conductive film over a light-transmitting substrate; forming a first insulating film and a semiconductor film in this order over the gate electrode and the data signal line; etching the semiconductor film to form a second semiconductor film over the gate electrode; etching the first insulating film to form a first opening which reaches the gate electrode and a second opening which reaches the data signal line; forming a second conductive film over the first insulating film and the second semiconductor film; etching the second conductive film to form a scan signal line which is electrically connected to the gate electrode through the first opening, a source electrode and a drain electrode, one of which is electrically connected to the data signal line through the second opening, and an auxiliary capacitor line; forming a second insulating film over the first insulating film, the second semiconductor film, the source electrode and the drain electrode, the scan signal line, and the auxiliary capacitor line; forming a third insulating film over the second insulating film; removing part of the second insulating film and part of the third insulating film to form a third opening which reaches the drain electrode; removing part of the third insulating film to form a fourth opening by which the second insulating film formed over the auxiliary capacitor line is exposed; and forming, over the third insulating film, a pixel electrode which is electrically connected to the drain electrode through the third opening and which is included as well as the auxiliary capacitor line in an auxiliary capacitor portion where the second insulating film is used as a dielectric film in the fourth opening.

Another embodiment of the present invention is a method for manufacturing a display device including the steps of forming a gate electrode and a data signal line which are formed using a first conductive film over a light-transmitting substrate; forming a first insulating film, a semiconductor film, and an impurity semiconductor film to which an impurity element imparting one conductivity type is added in this order over the gate electrode and the data signal line; forming a first mask layer over the impurity semiconductor film by photolithography using a multi-tone mask; etching the first insulating film, the semiconductor film, and the impurity semiconductor film using the first mask layer to form a first opening which reaches the gate electrode and a second opening which reaches the data signal line; performing ashing on the first mask layer to form a second mask layer; etching the semiconductor film and the impurity semiconductor film using the second mask layer to form a second semiconductor film and a second impurity semiconductor film; forming a second conductive film over the first insulating film and the second impurity semiconductor film; forming a third mask layer over the second conductive film; etching the second conductive film and the second impurity semiconductor film using the third mask layer to form a scan signal line which is electrically connected to the gate electrode through the first opening, a source electrode and a drain electrode one of which is electrically connected to the data signal line through the second opening, an auxiliary capacitor line, a third impurity semiconductor film, and a fourth impurity semiconductor film; forming a second insulating film over the first insulating film, the second semiconductor film, the third impurity semiconductor film, the fourth impurity semiconductor film, the source electrode and the drain electrode, the scan signal line, and the auxiliary capacitor line; forming a third insulating film over the second insulating film; forming, in the third insulating film, a third opening by which the second insulating film is exposed and a recessed portion which is recessed when seen in cross section and in which the third insulating film remains, by performing photolithography using a multi-tone mask; etching the second insulating film in the third opening to form a fourth opening which reaches the drain electrode; performing ashing on the third insulating film in the recessed portion to form a fifth opening by which the second insulating film formed over the auxiliary capacitor line is exposed; and forming, over the third insulating film, a pixel electrode which is electrically connected to the drain electrode through the fourth opening and which is included as well as the auxiliary capacitor line in an auxiliary capacitor portion where the second insulating film is used as a dielectric film in the fifth opening.

Another embodiment of the present invention is that since only a passivation film is used as a dielectric film in an auxiliary capacitor portion in a display device, the thickness of the dielectric film can be small. Thus, the area of the auxiliary capacitor portion can be small, so that the aperture ratio of a pixel portion can be improved. Further, a display device with a high aperture ratio can be produced at low cost.

BRIEF DESCRIPTION OF THE DRAWINGS

In the accompanying drawings:

FIG. 1 is a plane view of a display device according to one embodiment of the present invention;

DETAILED DESCRIPTION OF THE INVENTION

Figure 2A:
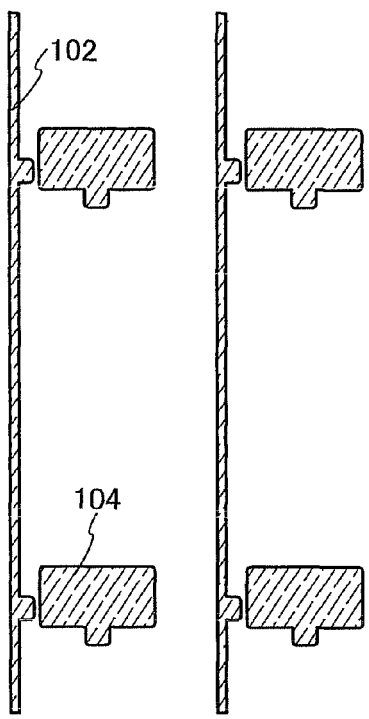
FIGS. 2A to 2D are views illustrating a film formation process of the display device according to one embodiment of the present invention.

Hereinafter, embodiments of the present invention will be described with reference to the accompanying drawings. However, the present invention can be implemented in various modes, and it is easily understood by those skilled in the art that modes and details can be variously changed without departing from the scope and the spirit of the present invention. Therefore, the present invention is not construed as being limited to description of the embodiments. Note that in the drawings of this specification, the identical portions or portions having a similar function are denoted by the identical reference numerals, and the description thereof may be omitted.

Embodiment 1

In this embodiment, a display device having a thin film transistor (hereinafter, referred to as a TFT) and a manufacturing process thereof will be described with reference to FIG. 1, FIGS. 2A to 2D, FIG. 3, and FIG. 4.

In a TFT, carrier mobility is higher when an n-type semiconductor is used as a semiconductor film as compared to the case of using a p-type semiconductor; therefore, an n-type TFT is more suitable for forming a driver circuit. However, in this embodiment, either an n-type TFT or a p-type TFT may be employed. Even in the case of using a TFT with either polarity, all the TFTs formed over one substrate have the same polarity, whereby the number of steps can be suppressed. On the other hand, in the case of using both p-type and n-type TFTs, it is possible to form a driver circuit with low power consumption. Here, a pixel TFT using an n-channel TFT and a manufacturing process thereof will be described.

Figure 3:
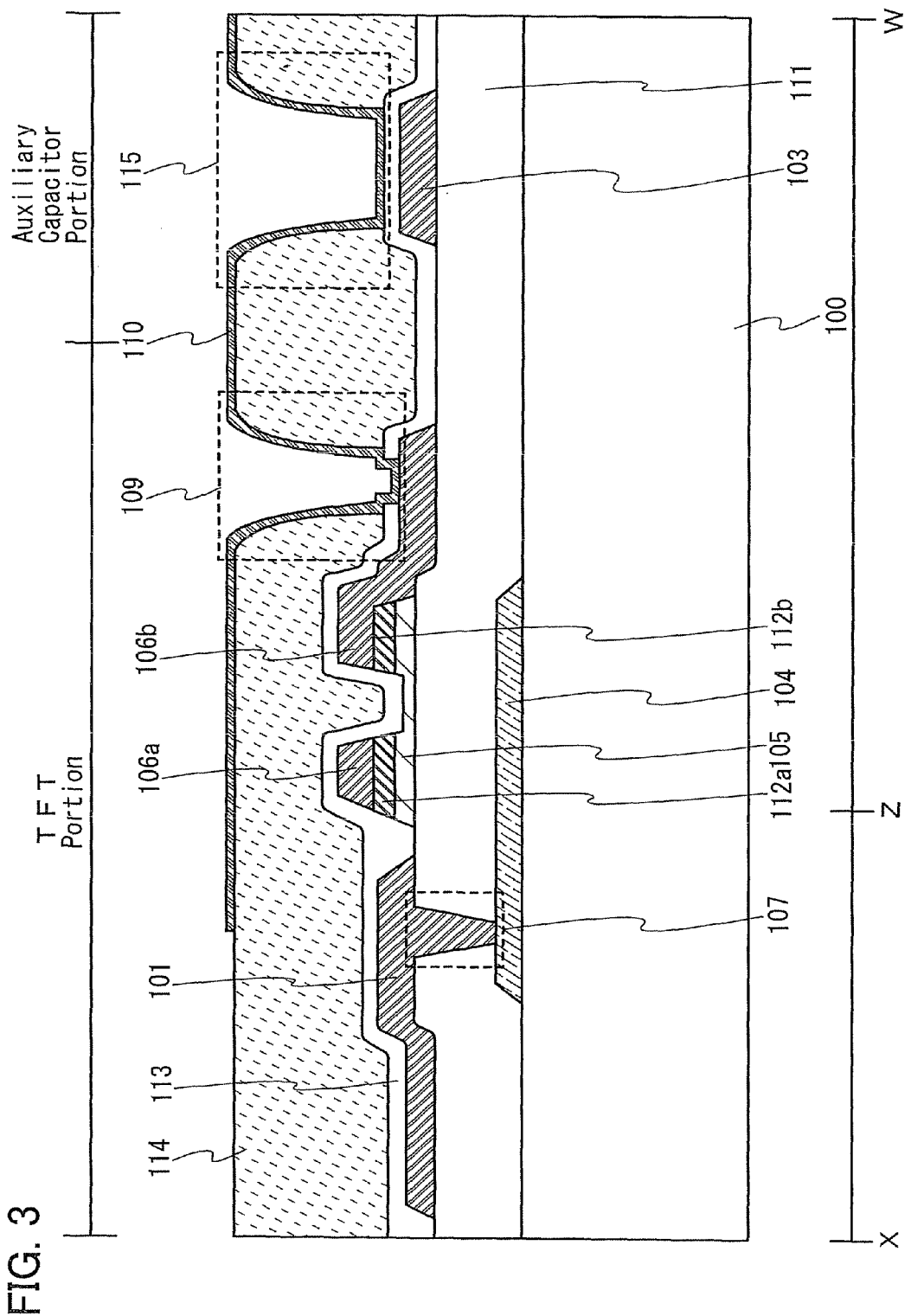
FIG. 3 is a cross-sectional view of a display device according to one embodiment of the present invention.

FIG. 1 is an example of a plane view of a display device having a TFT using an active matrix substrate according to this embodiment. For simplification, FIG. 1 illustrates one pixel structure of a plurality of pixels which are arranged in matrix. FIG. 3 is a cross-sectional view taken along a line X-Z-Y of FIG. 1 and FIG. 4 is a cross-sectional view taken along a line Y-Z-W of FIG. 1.

Figure 4:
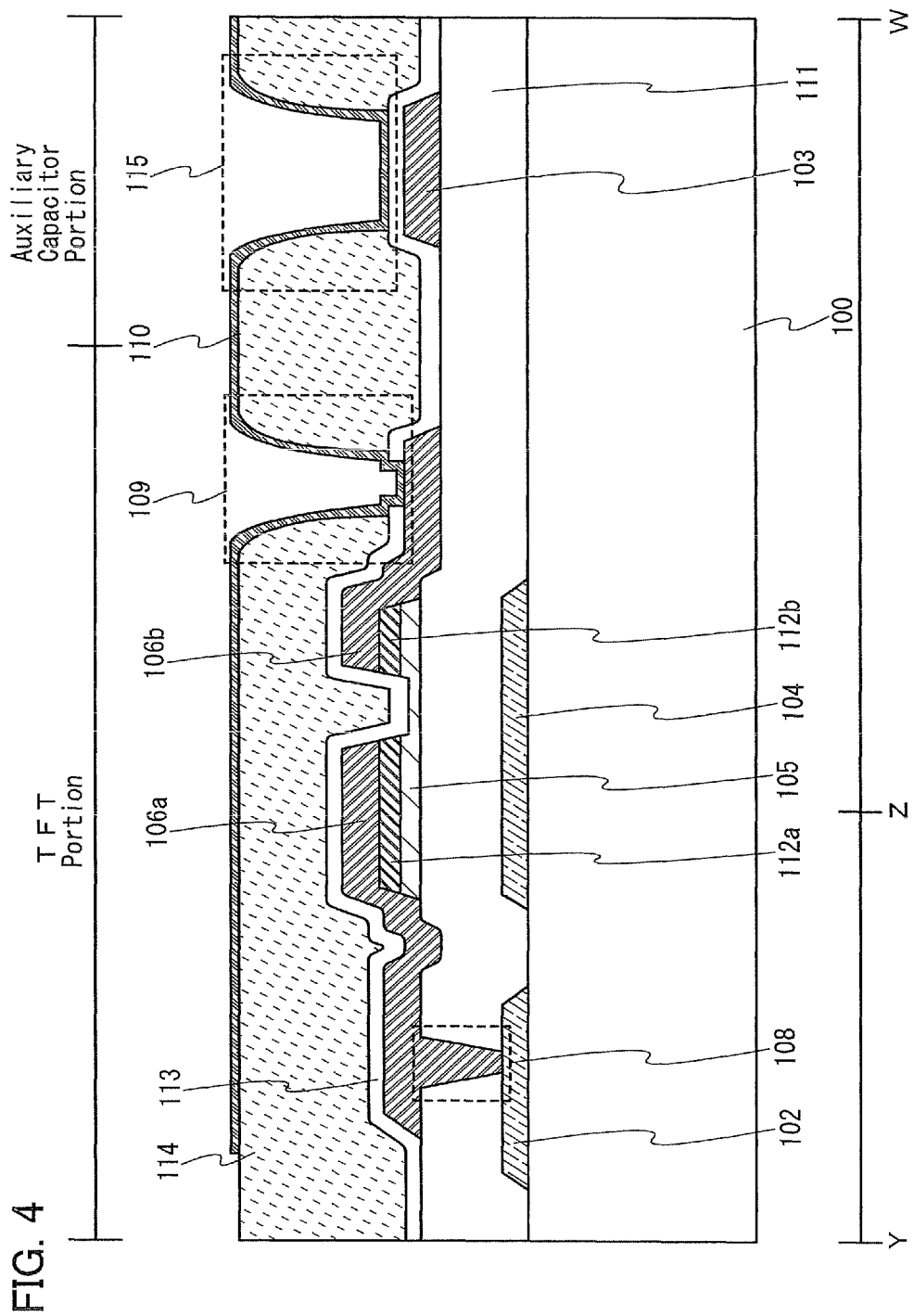
FIG. 4 is a cross-sectional view of a display device according to one embodiment of the present invention.

As illustrated in FIG. 1, FIG. 3, and FIG. 4, the active matrix substrate has a plurality of scan signal lines 101 which are arranged in parallel with each other and a plurality of data signal lines 102 which intersect with each scan signal line 101 over a light-transmitting substrate 100. The scan signal lines 101 are provided in a horizontal direction with respect to the substrate surface and the data signal lines 102 are provided in a vertical direction with respect to the substrate surface. Here, "a vertical direction" and "a horizontal direction" are directions which are set arbitrarily. On a rectangular substrate surface, the direction of the short side may be "a vertical direction" or "a horizontal direction". Further, the active matrix substrate has a plurality of auxiliary capacitor lines 103 which are parallel to each scan signal line 101. The data signal lines 102 are formed using a first conductive film. The scan signal lines 101 and the auxiliary capacitor lines 103 are formed using a second conductive film. A pixel electrode 110 formed using a light-transmitting conductive film is arranged in a region surrounded by the scan signal lines 101 and the data signal lines 102 so as to overlap with the scan signal line 101 and the data signal line 102 in a peripheral edge portion.

Further, a TFT is provided as a switching element at the periphery of the intersection of the scan signal line 101 and the data signal line 102. The TFT includes a gate electrode 104 formed using the first conductive film; a gate insulating film over the gate electrode; a semiconductor film 105 over the gate insulating film; an impurity semiconductor film 112a and an impurity semiconductor film 112b over the semiconductor film 105, to which an impurity element imparting one conductivity type is added; and a source or drain electrode 106a and a source or drain electrode 106b over the impurity semiconductor film 112a and the impurity semiconductor film 112b, to which an impurity element imparting one conductivity type is added. Note that the TFT used in this embodiment is an inversed staggered TFT with a channel-etched structure. However, the TFT which can be used in the present invention is not limited thereto and the mode can be changed without departing from the scope and spirit of the present invention.

In the TFT portion, the gate electrode 104 and the scan signal line 101 are electrically connected to each other through an opening 107 in the gate insulating film 111. Further, one of the source or drain electrode 106a and the source or drain electrode 106b is electrically connected to the data signal line 102 through an opening 108 in the gate insulating film 111. Furthermore, the other of the source or drain electrode 106a and the source or drain electrode 106b is electrically connected to the pixel electrode 110 through an opening 109 in a passivation film 113 and a planarization film 114 formed in order to planarize the passivation film 113 and the pixel electrode 110. Note that the source electrode or the drain electrode is determined depending on the potential of the electrode; therefore, the source electrode and the drain electrode switch positions with each other depending on the potential of the electrode. The passivation film is a protection film which is formed in order to prevent a contamination impurity such as an organic matter, a metal, or water vapor suspended in the air from entering the semiconductor films.

An auxiliary capacitor portion has a structure where in an opening 115, the auxiliary capacitor line 103 formed using the second conductive film serves as a lower electrode and the pixel electrode 110 servers as an upper electrode with only the passivation film 113 as a dielectric film interposed therebetween.

Figure 2B:
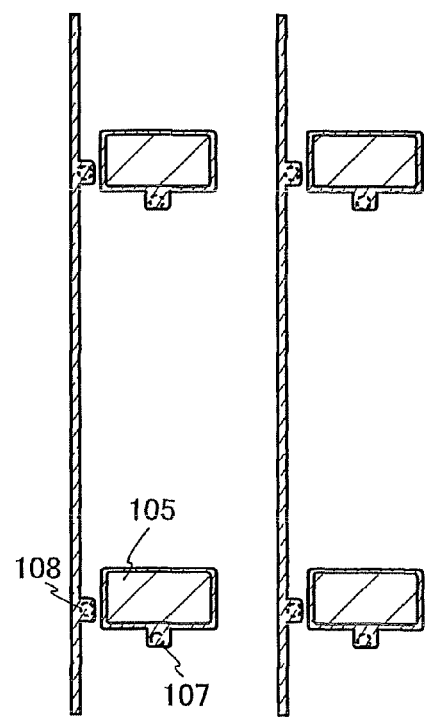
Figure 2C:
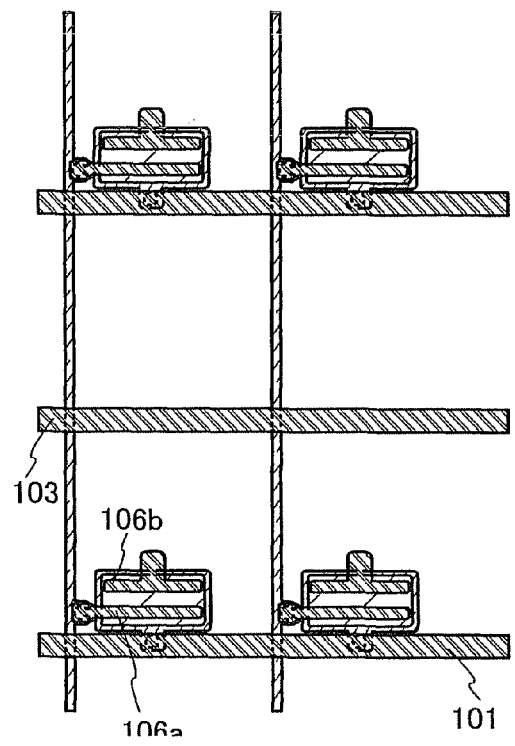
Figure 2D:
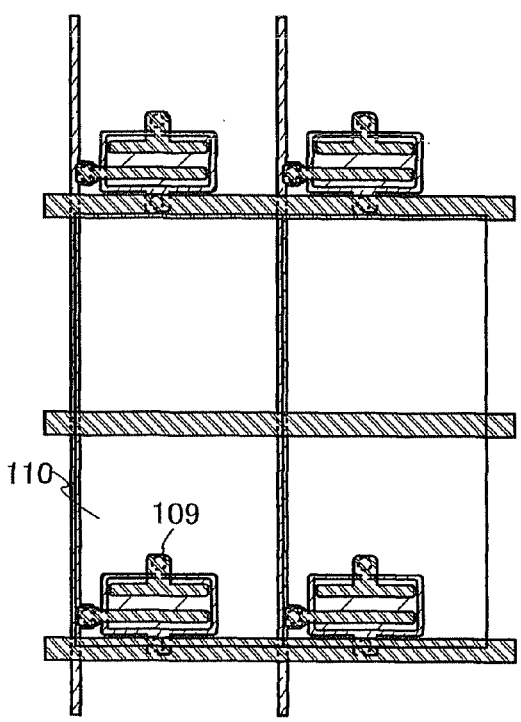

FIGS. 2A to 2D are views illustrating a state where each layer is stacked in order. In FIG. 2A, patterns of the data signal line 102 and the gate electrode 104 are formed using the first conductive film. In FIG. 2B, patterns of the semiconductor film 105 and the impurity semiconductor film 112a and the impurity semiconductor film 112b, to which an impurity element imparting one conductivity type is added, are formed over the gate insulating film 111 in the TFT portion. In addition, the opening 107 and the opening 108 are formed in the gate insulating film 111. Note that the gate insulating film 111 and the impurity semiconductor film 112a and the impurity semiconductor film 112b, to which an impurity element imparting one conductivity type is added, are not illustrated in FIG. 2B. In FIG. 2C, the scan signal line 101, the auxiliary capacitor line 103, the source or drain electrode 106a and the source or drain electrode 106b are formed using the second conductive film. In FIG. 2D, the opening 109 and the opening 115 are framed in the passivation film 113 and the planarization film 114 over the source or drain electrode 106a and the source or drain electrode 106b. Further, the pixel electrode 110 formed using a light-transmitting conductive film is also formed over the passivation film 113 and the planarization film 114. Note that the passivation film 113 and the planarization film 114 are not illustrated in FIG. 2D.

With the above-described pixel structure, only passivation film is used as a dielectric film of the auxiliary capacitor portion; therefore, the thickness of the dielectric film can be small. Thus, the area of the auxiliary capacitor portion can be small, so that the aperture ratio of a pixel portion can be improved.

Further, connection of the data signal line through the opening is not made and the data signal line can be formed using one conductive film without connection through an opening, so that signal delay due to contact resistance does not occur. Accordingly, wiring delay of a data signal can be reduced, so that a large display device with especially high quality can be manufactured. Further, if a contact failure occurs in the data signal line, not a line defect but a point defect occurs. Therefore, a defect of a displayed image is not easily recognized, which leads to improvement in image quality and reliability. Further, yield is improved in terms of mass production.

Since there exist no extra electrodes between the pixel electrode and a counter electrode which are included in a pixel electric capacitance portion, electric filed is applied to liquid crystal evenly, so that the image quality is improved.

Further, by using the planarization film, the pixel electrode which is provided as an uppermost layer is formed to be planar without being affected by the uneven shape of a structural object in a lower layer than the pixel electrode, so that orientation disorder of liquid crystal molecules due to the uneven shape is suppressed and the orientation of the liquid crystal molecules can be controlled ideally. Therefore, image display with high quality is possible. Further, since provision of the planarization film makes it possible to significantly reduce parasitic capacitance between the pixel electrode and the data signal line and between the pixel electrode and the scan signal line, the peripheral edge portion of the pixel electrode can overlap with the data signal line and the scan signal line, so that higher aperture ratio of the pixel can be realized.

Further, since the auxiliary capacitor line can be provided over the data signal line, the auxiliary capacitor portion can be formed even in a region where the pixel electrode, the auxiliary capacitor line and the data signal line are stacked. Accordingly, the area of the auxiliary capacitor line can be reduced by the area where the pixel electrode, the auxiliary capacitor line, and the data signal line are overlapped with each other, so that higher aperture ratio of the pixel can be realized.

In a pixel or the like conforming to High Definition Television (HDTV), a distance between adjacent scan signal lines is set to be longer than a distance between adjacent data signal lines. Accordingly, when the auxiliary capacitor line is provided to extend in the same direction as the scan signal line, the distance between the adjacent scan signal lines can be longer, so that line-to-line capacitance (parasitic capacitance) can be reduced. Further, since the distance between the adjacent scan signal lines is longer than the distance between the adjacent data signal lines, the auxiliary capacitor line can be provided between the scan signal lines more easily than between the data signal lines.

Hereinafter, a manufacturing method will be described in detail. FIGS. 5A to 5C, FIGS. 6A to 6C, FIGS. 7A to 7C, FIGS. 8A to 8C, and FIGS. 9A to 9C are views illustrating a manufacturing process of a display device having a TFT. FIGS. 5A to 5C, FIGS. 6A to 6C, FIGS. 7A to 7C, FIGS. 8A to 8C, and FIGS. 9A to 9C correspond to a cross section taken along a line Y-Z-W in FIG. 1.

Figure 5A:
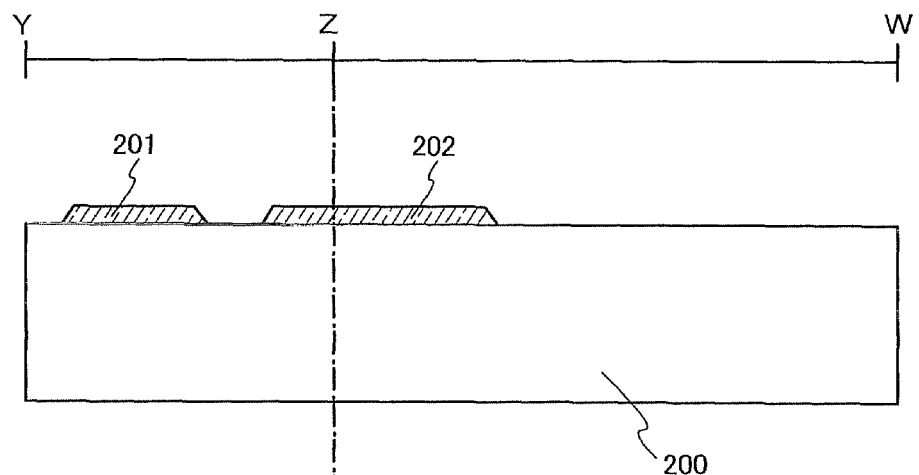
FIGS. 5A to 5C are views illustrating a method for manufacturing a display device according to one embodiment of the present invention.

The first conductive film is deposited over a light-transmitting substrate 200 to form a data signal line 201 and a gate electrode 202 (see FIG. 5A). As the light-transmitting substrate 200, any of the following substrates can be used: non-alkaline glass substrates manufactured by a fusion method or a float method, such as a barium borosilicate glass substrate, an aluminoborosilicate glass substrate, and an aluminosilicate glass substrate; a quartz substrate; a plastic substrate having heat resistant enough to withstand a process temperature of this manufacturing process; and the like. As the light-transmitting substrate 200, a substrate having a size of 320 mm×400 mm, 370 mm×470 mm, 550 mm×650 mm, 600 mm×720 mm, 680 mm×880 mm, 730 mm×920 mm, 1000 mm×1200 mm, 1100 mm×1250 mm, 1150 mm×1300 mm, 1500 mm×1800 mm, 1900 mm×2200 mm, 2160 mm×2460 mm, 2400 mm×2800 mm, 2850 mm×3050 mm, or the like can be used.

It is preferable to use aluminum or copper which is a low-resistant material for the first conductive film since the first conductive film serves as a wiring. When aluminum or copper is used, signal delay is reduced, so that higher image quality can be expected. When an alloy of aluminum and any of neodymium, silicon, copper, and the like, or a mixture of aluminum and any of neodymium, silicon, copper, and the like is used, hillocks or whiskers can be suppressed, and electromigration or stress migration can also be suppressed. An alloy of silicon or the like and copper may also be used for the same reason. Alternatively, the material of the first conductive film can be selected in consideration of an etchant at the time of processing a wiring. The data signal line 201 and the gate electrode 202 can be formed in such a manner that a conductive film is formed over the light-transmitting substrate 200 by a sputtering method, a vacuum evaporation method or a metal organic chemical vapor deposition (MOCVD) method, a mask layer is formed over the conductive film by a photolithography technique or an ink-jet method, and the conductive film is etched using the mask layer. Alternatively, the data signal line 201 and the gate electrode 202 can be formed by discharging a conductive nanopaste of silver, gold, copper, or the like by an inkjet method and baking it.

When aluminum or copper is used alone as the first conductive film, a protrusion such as a hillock or a whisker is generated due to stress applied between the first conductive film and the substrate or thermal history in a subsequent manufacturing step. The protrusion destroys the gate insulating film formed thereover and causes a defect such as an electrical short circuit or the like; therefore, a barrier layer is preferably formed by stacking a high-melting-point metal, such as molybdenum, titanium, tungsten or tantalum, which has a barrier property, or nitride thereof. When copper is used, there is particularly a concern that due to heat, copper diffuses into an i-type amorphous silicon film which is to be a channel formation region; therefore, the barrier layer is preferably formed. The barrier layer may be provided between the light-transmitting substrate 200 and the data signal line 201 and the gate electrode 202 or over the data signal line 201 and the gate electrode 202.

Note that since a semiconductor film and a wiring are formed over the data signal line 201 and the gate electrode 202, the data signal line 201 and the gate electrode 202 are preferably processed to have forward tapered edge portions in order to prevent disconnection or an electrical short circuit.

Figure 5B:
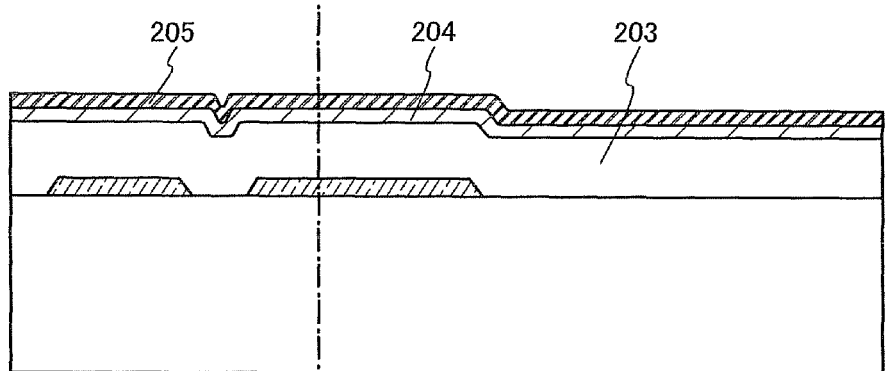

Next, a gate insulating film 203, a semiconductor film 204, and an impurity semiconductor film 205 to which an impurity element imparting one conductivity type is added are formed in this order over the data signal line 201 and the gate electrode 202 (see FIG. 5B).

Note that the gate insulating film 203, the semiconductor film 204, and the impurity semiconductor film 205 to which an impurity element imparting one conductivity type is added are preferably formed successively without being exposed to the atmosphere. By depositing successively the gate insulating film 203, the semiconductor film 204, and the impurity semiconductor film 205 to which an impurity element imparting one conductivity type is added without being exposed to the atmosphere, each interface between the stacked layers can be formed without being contaminated by atmospheric components or contaminating impurities suspended in the atmosphere. Thus, variation in the characteristics of thin film transistors can be reduced.

The gate insulating film 203 can be formed by a CVD method, a sputtering method, or the like using a silicon oxide film, a silicon nitride film, a silicon oxynitride film, or a silicon nitride oxide film. In this embodiment, a silicon nitride film is used for the gate insulating film 203. A silicon nitride film has a high relative permittivity and is preferable as a gate insulating film. In addition, the silicon nitride film also servers as a blocking film which prevents alkali metal ions such as sodium ions contained in a glass substrate from diffusing into the semiconductor film 204. Note that the gate insulating film 203 may also be formed by stacking a silicon nitride film or a silicon nitride oxide film and a silicon oxide film or a silicon oxynitride film in this order. Note that the gate insulating film 203 can also be formed by stacking not two layers but three layers of a silicon nitride film or a silicon nitride oxide film, a silicon oxide film or a silicon oxynitride film, and a silicon nitride film or a silicon nitride oxide film in this order from the substrate side. Furthermore, the gate insulating film 203 is preferably formed with the use of a microwave plasma CVD apparatus with a frequency of 1 GHz. A silicon nitride film, a silicon nitride oxide film or a silicon oxynitride film formed with the use of a microwave plasma CVD apparatus has high withstand voltage, and thus reliability of a thin film transistor which is to be manufactured later can be increased.

As an example of the three-layer structure of the gate insulating film 203, a silicon nitride film or a silicon nitride oxide film may be formed over the gate electrode 202 and the data signal line 201 as a first layer, a silicon oxynitride film may be formed as a second layer, and a silicon nitride film may be formed as a third layer. In addition, a semiconductor film may be formed over the silicon nitride film that is a top layer. In this case, the silicon nitride film or the silicon nitride oxide film as the first layer is preferably thicker than 50 nm and has an effect as a barrier which blocks impurities such as sodium, an effect of preventing a hillock of the gate electrode, an effect of preventing oxidation of the gate electrode, and the like.

The silicon nitride film as the third layer has effects of improving adhesion of the semiconductor film and preventing oxidation thereof.

A nitride film such as an ultrathin silicon nitride film is formed on a surface of the gate insulating film 203 as described above, whereby adhesion of the semiconductor film can be improved. The nitride film may be formed by a plasma CVD method, or by nitridation treatment that is treatment with plasma which is generated by microwaves and has high density and low temperature. In addition, the silicon nitride film or the silicon nitride oxide film may also be formed when a reaction chamber is subjected to silane flush treatment.

Note that, in this embedment mode, the silicon oxynitride film means a film that contains more oxygen than nitrogen and, when being measured using Rutherford backscattering spectrometry (RBS) and hydrogen forward scattering (HFS), includes oxygen, nitrogen, silicon, and hydrogen at concentrations ranging from 50 at. % to 70 at. %, 0.5 at. % to 15 at. %, 25 at. % to 35 at. %, and 0.1 at. % to 10 at. %, respectively. Further, the silicon nitride oxide film means a film that contains more nitrogen than oxygen and, when being measured using RBS and HFS, includes oxygen, nitrogen, silicon, and hydrogen at concentrations ranging from 5 at. % to 30 at. %, 20 at. % to 55 at. %, 25 at. % to 35 at. %, and 10 at. % to 30 at. %, respectively. Note that percentages of nitrogen, oxygen, silicon, and hydrogen fall within the ranges given above, where the total number of atoms contained in the silicon oxynitride film or the silicon nitride oxide film is defined as 100 at. %.

Selection of the material and the film formation method of the gate insulating film is an important factor in determining a film quality or film characteristics. When the gate insulating film and the passivation film are used as a dielectric film of the auxiliary capacitor portion as in a conventional manner, the relative permittivity of the gate insulating film needs to be taken into consideration at the time of forming the auxiliary capacitor portion. However, in this embodiment, only the passivation film is used as a dielectric film of the auxiliary capacitor portion; therefore, the material and the film formation method of the gate insulating film can be selected in consideration of only the design of a TFT such as the characteristics or the withstand voltage of the TFT.

The semiconductor film 204 is a semiconductor film to which an impurity element imparting conductivity is not added sufficiently and can be formed using an amorphous semiconductor, a microcrystalline semiconductor, or a polycrystalline semiconductor. In this embodiment, amorphous silicon is used as the semiconductor film 204.

When an n-channel thin film transistor is to be formed, to the impurity semiconductor film 205 to which an impurity element imparting one conductivity type is added, phosphorus may be added as a typical impurity element, and an impurity gas such as $PH_3$ may be added to silicon hydride. When a p-channel thin film transistor is to be formed, boron may be added as a typical impurity element, and an impurity gas such as $B_2H_6$ may be added to silicon hydride. The impurity semiconductor film 205 to which an impurity element imparting one conductivity type is added can be formed using an amorphous semiconductor, a microcrystalline semiconductor or a polycrystalline semiconductor. In this embodiment, amorphous silicon to which phosphorus is added at a high concentration is used as the impurity semiconductor film 205 to which an impurity element imparting one conductivity type is added. Note that the impurity semiconductor film 205 to which an impurity element imparting one conductivity type is added is preferably formed to have a thickness of 2 nm to 50 nm (preferably 10 nm to 30 nm). Note that the impurity semiconductor film 205 to which an impurity element imparting one conductivity type is added is not necessarily formed. In the case where the impurity semiconductor film 205 is not formed, in a similar manner to the impurity semiconductor film 205 to which an impurity element imparting one conductivity type is added, an impurity element may be added to the semiconductor film 204 to form a source region and a drain region of a thin film transistor.

Figure 5C:
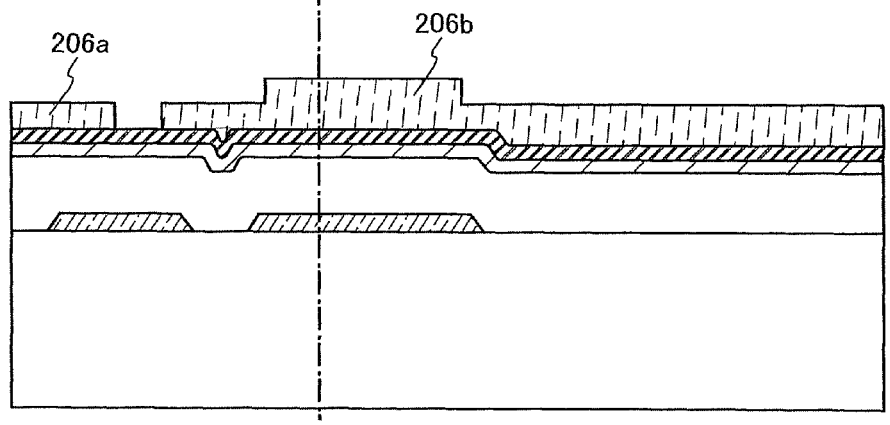

Next, a mask layer 206a and a mask layer 206b are formed over the semiconductor film 204 and the impurity semiconductor film 205 to which an impurity element imparting one conductivity type is added (see FIG. 5C).

The mask layer 206a and the mask layer 206b can be formed by light exposure using a multi-tone (high-tone) mask. The mask layer 206a and the mask layer 206b are formed using a resist. As the resist, a positive type resist or a negative type resist can be used. Here, a positive type resist is used.

Next, the resist is irradiated with light with the use of a multi-tone mask as a light-exposure mask, and the resist is exposed to the light.

Here, light exposure using the multi-tone mask will be described with reference to FIGS. 10A to 10D.

The multi-tone mask includes three kinds of portions; a light-transmitting portion through which light such as ultraviolet rays is completely transmitted, a semi-light-transmitting portion where light is reduced by blocking or absorbing, and a light-blocking portion where light is completely blocked. Accordingly, the multi-tone mask can achieve three levels of light exposure, and thus transmitted light has a plurality of intensity. One-time light exposure and development process allows a resist mask with regions of plural thicknesses (typically, two kinds of thicknesses) to be formed. Thus, the number of light-exposure masks can be reduced by using a multi-tone mask.

Figure 10A:
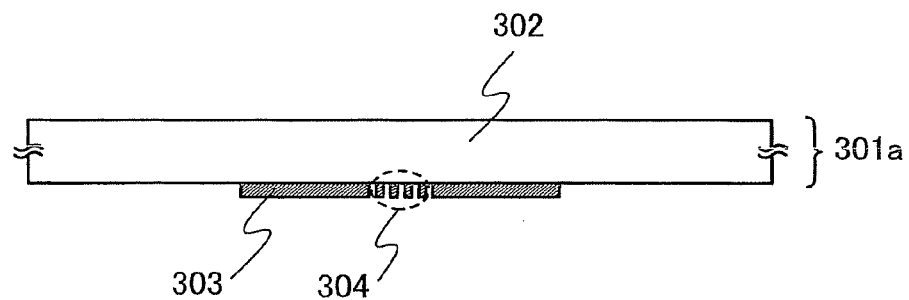
FIGS. 10A to 10D are views illustrating multi-tone masks which can be used in one embodiment of the present invention.
Figure 10B:
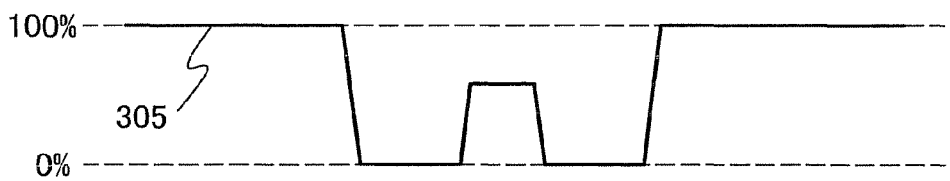
Figure 10C:
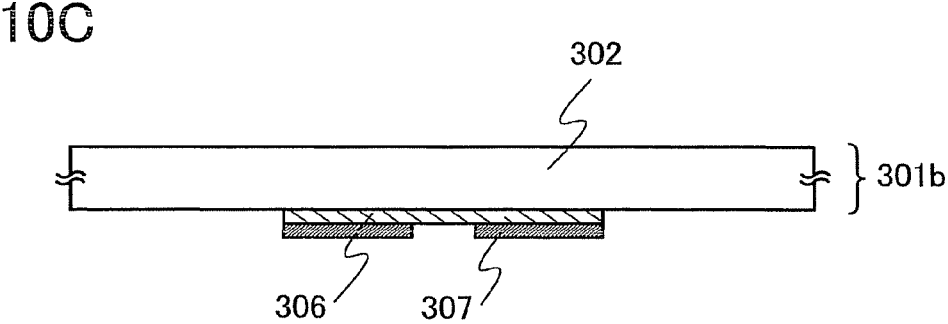

Typical examples of a multi-tone mask include a gray-tone mask 301a as illustrated in FIG. 10A, and a half-tone mask 301b as illustrated in FIG. 10C.

As illustrated in FIG. 10A, the gray-tone mask 301a includes a light-transmitting substrate 302, and a light-blocking portion 303 and a diffraction grating 304 serving as a semi-light-transmitting portion, which are formed on the light-transmitting substrate 302. Note that the light-transmitting portion is a portion of the light-transmitting substrate 302 on which the light-blocking portion 303 and the diffraction grating 304 are not formed. The light transmittance of the light-blocking portion 303 is 0%. In contrast, the light transmittance at the diffraction grating 304 can be controlled by setting an interval between light-transmitting portions such as slits, dots, or meshes to an interval of less than or equal to the limit of resolution of light used for the exposure. Note that the diffraction grating 304 can have regularly-arranged slits, dots, or meshes form, or irregularly-arranged slits, dots, or meshes.

As the light-transmitting substrate 302, a substrate that can transmit light, such as a quartz substrate, can be used. The light-blocking portion 303 and the diffraction grating 304 can be formed using a light-blocking material that absorbs light, such as chromium or chromium oxide.

When the gray-tone mask 301a is irradiated with light for exposure, a light transmittance 305 of the light-blocking portion 303 is 0% and that of a region where neither the light-blocking portion 303 nor the diffraction grating 304 are provided is 100%, as shown in FIG. 10B. In addition, the light transmittance of the diffraction grating 304 can be controlled in the range of 10% to 70%. The light transmittance in the diffraction grating 304 can be controlled by adjusting the interval of slits, dots, or meshes of the diffraction grating and the pitch thereof.

As illustrated in FIG. 10C, the half-tone mask 301b includes the light-transmitting substrate 302, and a semi-light-transmitting portion 306 and a light-blocking portion 307, which are formed on the light-transmitting substrate 302. The semi-light-transmitting portion 306 can be formed using MoSiN, MoSi, MoSiO, MoSiON, CrSi, or the like. The light-blocking portion 307 can be formed using a light-blocking material which absorbs light such as chromium or chromium oxide.

Figure 10D:
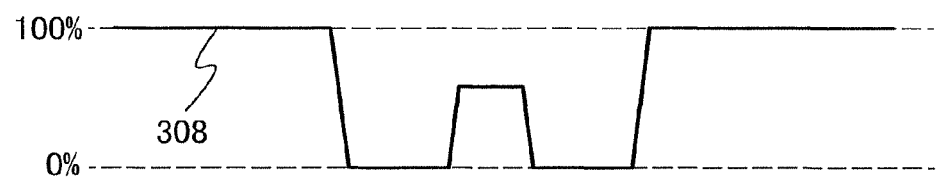

When the half-tone mask 301b is irradiated with light for exposure, a light transmittance 308 of the light-blocking portion 307 is 0% and that of a region where neither the light-blocking portion 307 nor the semi-light-transmitting portion 306 are provided is 100%, as shown in FIG. 10D. In addition, the light transmittance of a region where only the semi-light-transmitting portion 306 is provided can be controlled in the range of 10% to 70%. The light transmittance of the region where only the semi-light-transmitting portion 306 is provided can be controlled by adjusting the material of the semi-light-transmitting portion 306.

After light exposure using the multi-tone mask as described above, development is performed, whereby the mask layer 206a and the mask layer 206b including regions with different thicknesses can be formed (see FIG. 5C).

Figure 6A:
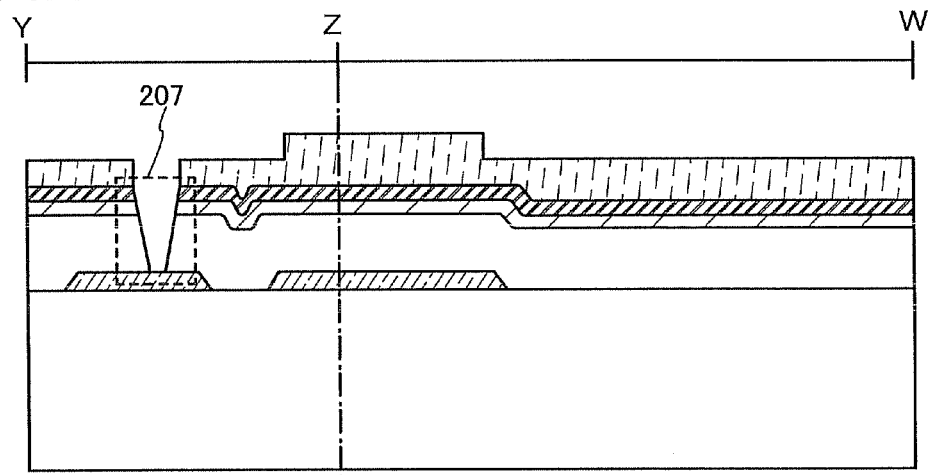
FIGS. 6A to 6C are views illustrating a method for manufacturing a display device according to one embodiment of the present invention.
Figure 6B:
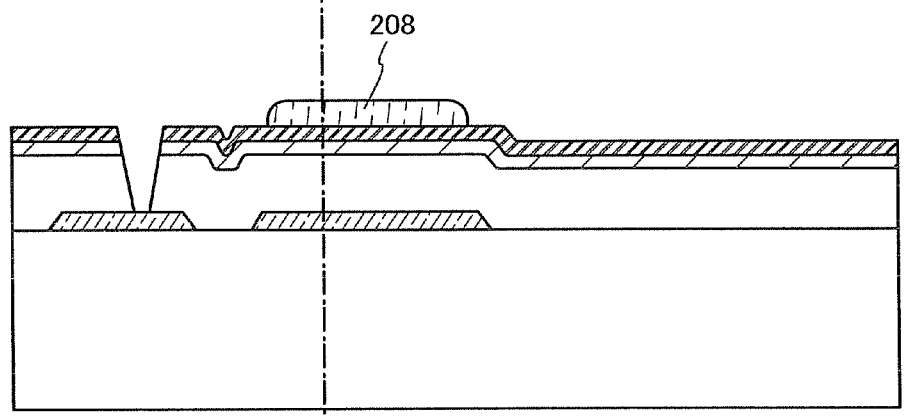

Next, with the use of the mask layer 206a and the mask layer 206b, the gate insulating film 203, the semiconductor film 204, and the impurity semiconductor film 205 to which an impurity element imparting one conductivity type is added are etched to form an opening 207 which reaches the data signal line 201 (see FIG. 6A). Further, at this time, also in a cross section taken along a line X-Z of FIG. 1, the gate insulating film 203, the semiconductor film 204 and the impurity semiconductor film 205 to which an impurity element imparting one conductivity type is added are etched to form an opening which reaches the gate electrode.

Next, ashing is performed on the mask layer 206a and the mask layer 206b. As a result, each area of the mask layer 206a and the mask layer 206b is decreased, and each thickness thereof is reduced. At this time, resists of the mask layer 206a and the mask layer 206b in regions with small thicknesses are removed, so that a mask layer 208 can be formed (see FIG. 6B). Note that "ashing" means that a resist is removed in such a manner that an active oxygen molecule, an ozone molecule, an oxygen atom, or the like generated by discharge or the like chemically acts on a resist which is an organic substance to ash the resist.

Figure 6C:
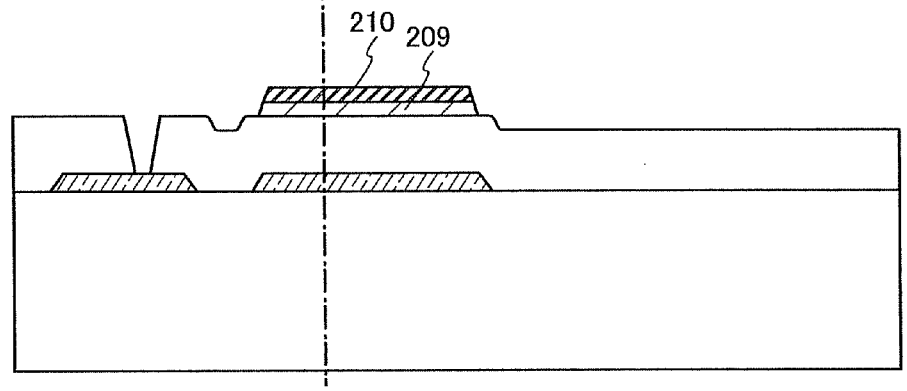

The semiconductor film 204 and the impurity semiconductor film 205 to which an impurity element imparting one conductivity type is added are etched using the mask layer 208 to form a semiconductor film 209 and an impurity semiconductor film 210 to which an impurity element imparting one conductivity type is added (see FIG. 6C). After that, the mask layer 208 is removed.

Since a mask layer formed with the use of a multi-tone mask as a light-exposure mask has a plurality of film thicknesses, and can be changed shapes thereof by performing ashing, the mask layer can be used in a plurality of etching steps to process into different patterns. Therefore, a mask layer corresponding at least two kinds or more of different patterns can be formed by one multi-tone mask. Thus, the number of light-exposure masks can be reduced and the number of corresponding photolithography steps can be also reduced, whereby simplification of a process can be realized.

Note than when a multi-tone mask is not used, it is preferable to form the opening 207 after the semiconductor film 204 and the impurity semiconductor film 205 to which an impurity element imparting one conductivity type is added are etched to form the semiconductor film 209 and the impurity semiconductor film 210 to which an impurity element imparting one conductivity type is added.

Figure 7A:
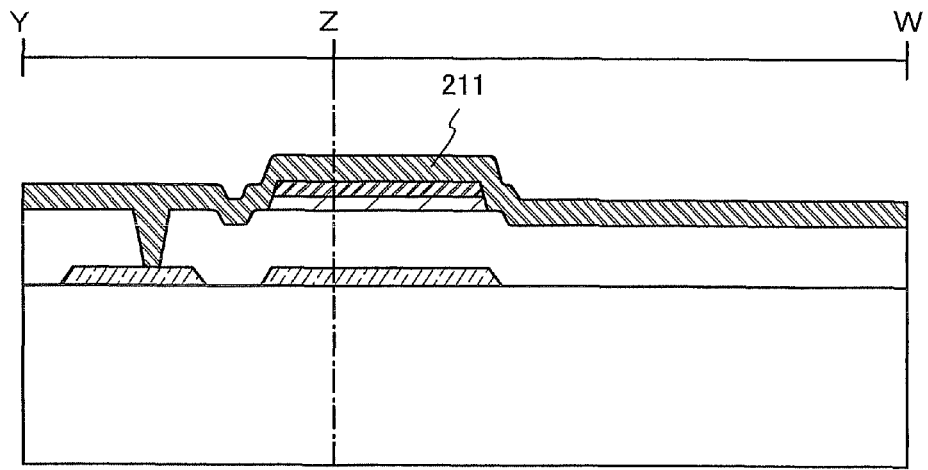
FIGS. 7A to 7C are views illustrating a method for manufacturing a display device according to one embodiment of the present invention.

A second conductive film 211 which is to be a source electrode, a drain electrode, and a scan signal line is formed over the opening 207, the gate insulating film 203, the semiconductor film 209 and the impurity semiconductor film 210 to which an impurity element imparting one conductivity type is added (see FIG. 7A). A portion of the second conductive film which is to be a source electrode or a drain electrode is connected to the data signal line 201 through the opening 207. Further, also in the cross section taken along the line X-Z of FIG. 1, a portion of the second conductive film which is to be a scan signal line is connected to the gate electrode through the opening over the gate electrode.

The second conductive film 211 is preferably limited using aluminum or copper which is a low-resistant material in a similar manner to the first conductive film. When aluminum or copper is used, signal delay is reduced, so that higher image quality can be expected. When an alloy of aluminum and any of neodymium, silicon, copper, and the like, or a mixture of aluminum and any of neodymium, silicon, copper, and the like is used, hillocks or whiskers can be suppressed, and electromigration or stress migration can also be suppressed. An alloy of copper and silicon or the like may also be used for the same reason. Further it is preferable to form barrier layers using a high-melting-point metal, such as molybdenum, titanium, tungsten, or tantalum which has a barrier property or nitride thereof and interpose the above-described low-resistant material between the barrier layers. In this case, the high-melting-point metal which is formed on the lower side of the low-resistant material has an effect of suppressing interdiffusion between the impurity element imparting one conductivity type contained in the impurity semiconductor film 210 and aluminum or copper. The high-melting-point metal which is formed on the upper side of the low-resistant material has an effect of preventing corrosion of the second conductive film due to cell reaction at the time of connection with the pixel electrode.

The second conductive film 211 may be formed by a sputtering method, a vacuum evaporation method or a metal organic chemical vapor deposition (MOCVD) method. Alternatively, the second conductive film 211 may be formed by discharging a conductive nanopaste of silver, gold, copper, or the like by a screen printing method, an ink-jet method, or the like and baking it.

Figure 7B:
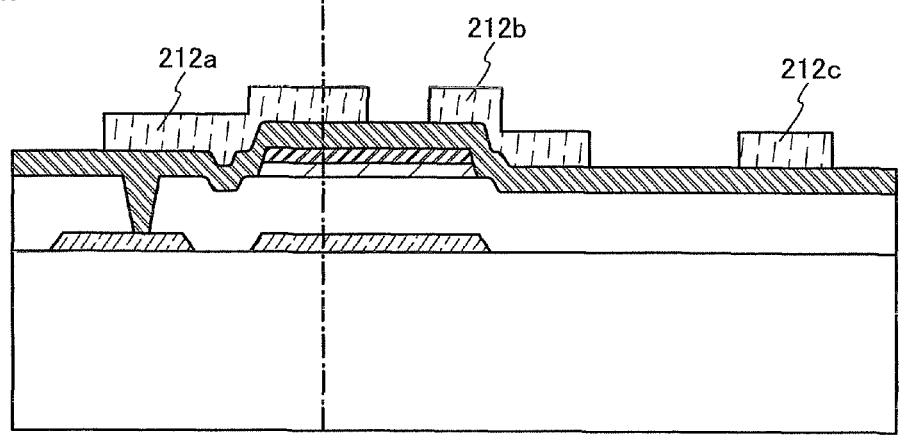

A mask layer 212a, a mask layer 212b and a mask layer 212c are formed over the second conductive film 211 (see FIG. 7B).

Figure 7C:
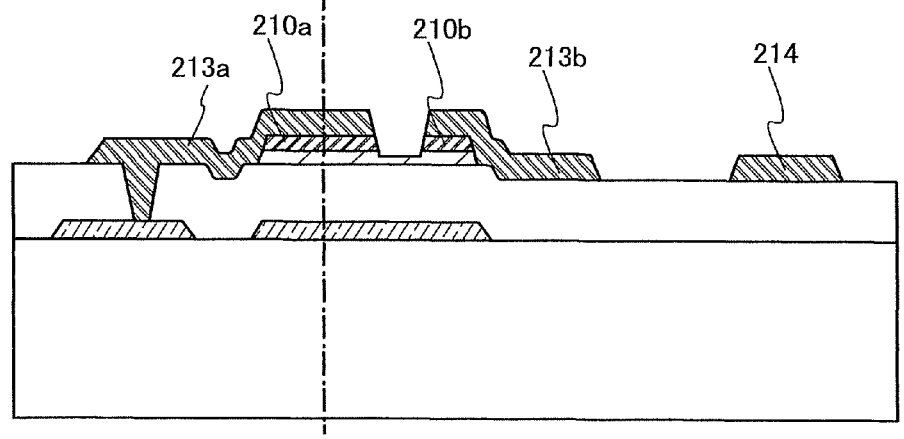

With the use of the mask layers 212a to 212c, the impurity semiconductor film 210 to which an impurity element imparting one conductivity type is added and the second conductive film 211 are etched to form an impurity semiconductor film 210a and an impurity semiconductor film 210b, to which an impurity element imparting one conductivity type is added, a source or drain electrode 213a, a source or drain electrode 213b and an auxiliary capacitor line 214 (see FIG. 7C). At this time, the semiconductor film 209 is also preferably etched to have a portion that is recessed when seen in cross section so that a channel-etched thin film transistor can be obtained. Thus, the impurity semiconductor film 210a and the impurity semiconductor film 210b, to which an impurity element imparting one conductivity type is added, are completely divided, so that electrical short-circuit can be prevented. Further, at this time, also in a cross section take along the line X-Z of FIG. 1, the second conductive film is etched to form the scan signal line.

Figure 8A:
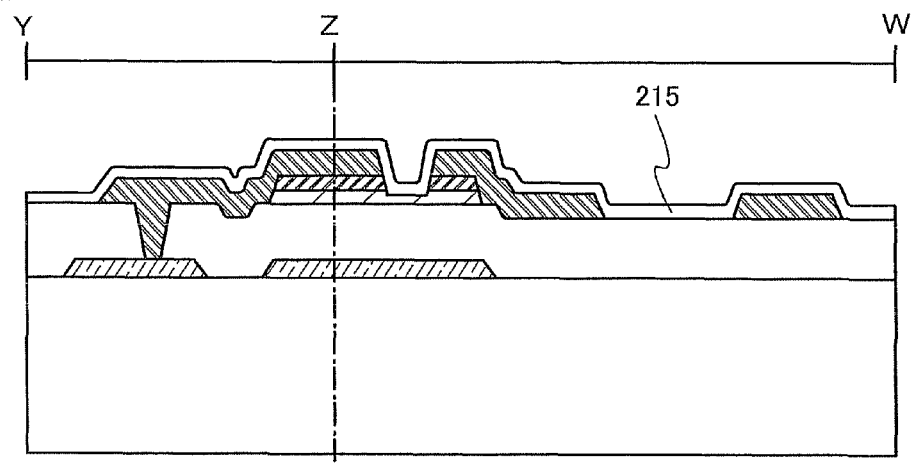
FIGS. 8A to 8C are views illustrating a method for manufacturing a display device according to one embodiment of the present invention.
Figure 8B:
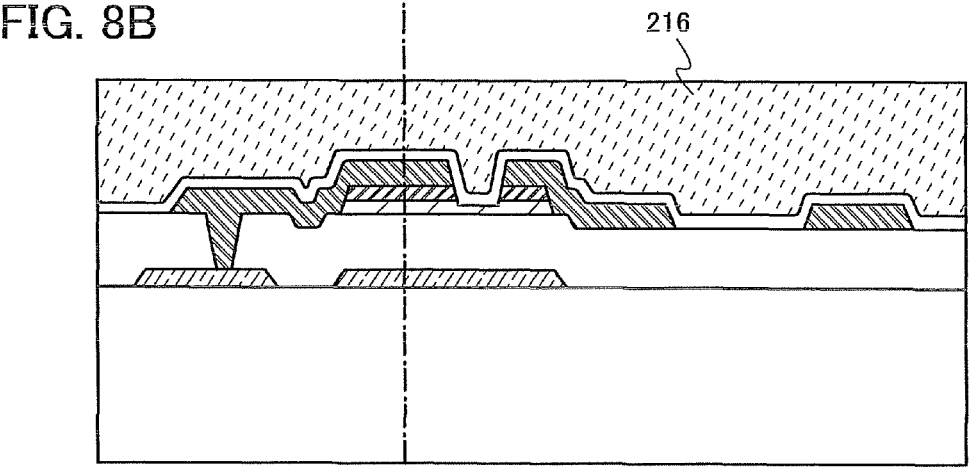
Figure 8C:
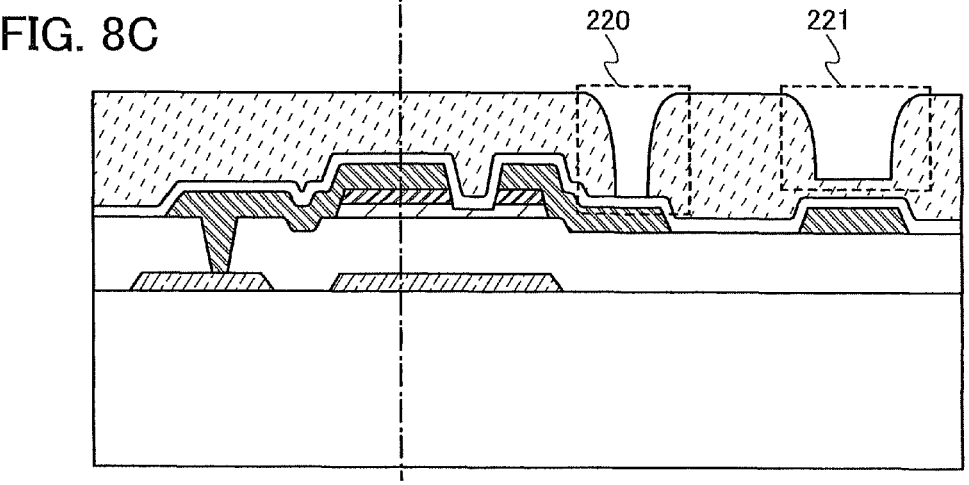

Next, a passivation film 215 is formed over the source or drain electrode 213a, the source or drain electrode 213b, the auxiliary capacitor line 214, the impurity semiconductor film 210a and the impurity semiconductor film 210b, to which an impurity element imparting one conductivity type is added, the semiconductor film 209, and the gate insulating film 203 (see FIG. 8A).

The passivation film 215 can be formed in a similar manner to the gate insulating film 203. Note that the passivation film 215 is provided to prevent entry of contamination impurities such as an organic substance, a metal, or moisture suspended in the atmosphere. Thus, the passivation film 215 is preferably a dense film. Further, since the passivation film 215 serves as a dielectric film in the auxiliary capacitor portion, the passivation film 215 preferably has a high relative permittivity.

The passivation film 215 can be formed using a silicon oxide film, a silicon nitride film, a silicon oxynitride film, or a silicon nitride oxide film by a CVD method, a sputtering method, or the like. In this embodiment, a layer in which two silicon nitride films are stacked is used as the passivation film 215. A silicon nitride film has a high relative permittivity and is preferable as the passivation film. At this time, the silicon nitride film in an upper layer has a small thickness and a dense structure and the silicon nitride film in a lower layer has a large thickness and a rough structure. The silicon nitride film in an upper layer having a dense structure prevents entry of contamination impurities. Even if contamination impurities penetrate through the silicon nitride film in an upper layer, the silicon nitride film in a lower layer having a large thickness prevents contamination impurities from reaching the semiconductor element. In this two layer structure, the silicon nitride film in a lower layer having a large thickness is deposited at a high speed and the silicon nitride film in an upper layer having a small thickness is deposited for a relatively long time; therefore, throughput can be increased in a mass production process. Of course, the structure of the passivation film 215 is not limited thereto. The passivation film 215 may have a single-layer structure or a stacked-layer structure in which two or more layers of a silicon oxide film, a silicon nitride film, a silicon oxynitride film and a silicon nitride oxide film are freely combined. The passivation film 215 is preferably formed using a microwave plasma CVD apparatus with a frequency of 1 GHz. A silicon nitride film, a silicon nitride oxide film or a silicon oxynitride film formed with use of a microwave plasma CVD apparatus has high withstand voltage, and thus reliability of a thin film transistor which is to be manufactured later can be increased. The silicon nitride film may be formed by a plasma CVD method, or by nitridation treatment that is treatment with plasma which is generated by microwaves and has high density and low temperature. In addition, the silicon nitride film or the silicon nitride oxide film may also be formed when a reaction chamber is subjected to silane flush treatment.

Next, a planarization film 216 is formed over the passivation film 215. The planarization film 216 is formed by applying a photosensitive organic resin material (see FIG. 8B). As an organic resin material, a material such as a polyimide-based material, a polyester-based material or a poly-acrylic ester based material is used. The organic resin material described above has a low relative permittivity of about 2 to 3 as compared to an inorganic insulating material such as silicon nitride so that it has an effect of reducing parasitic capacitance between the conductive films.

Next, in the TFT portion, in order to connect a pixel electrode 219 and the source or drain electrode 213b to each other, an opening 217 is formed in the passivation film 215 and the planarization film 216. On the other hand, in the auxiliary capacitor portion, an opening 218 is formed in only the planarization film 216. At this time, the opening in the planarization film 216 is formed by a photolithography technique and the opening in the passivation film 215 is formed by etching.

Here, in order to form the opening 217 in the TFT portion and the opening 218 in the auxiliary capacitor portion with the use of the same mask, a multi-tone mask is used. The multi-tone mask is arranged so that the light-transmitting portion is placed over a portion where the opening 217 is formed and the semi-light-transmitting portion is placed over a portion where the opening 218 is formed, and ultraviolet irradiation is performed, whereby the opening is formed in the planarization film 216 formed using a photosensitive organic resin material to form an opening 220 and a recessed portion 221 which is recessed when seen in cross section (see FIG. 8C). Here, as a photosensitive organic resin material, a positive photosensitive organic resin material, where a portion exposed to light is dissolved and removed by development is used.

Since the planarization film 216 above the source or drain electrode 213b in the TFT portion corresponds to the light-transmitting portion of the multi-tone mask, the planarization film 216 above the source or drain electrode 213b is irradiated with ultraviolet rays having a strong intensity without the intensity of the ultraviolet rays being reduced. Therefore, the ultraviolet rays reach the bottom of the planarization film 216, and thus a photo sensitizer contained in the organic resin material starts promoting dissolution. On the other hand, the planarization film 216 above the auxiliary capacitor line 214 of the auxiliary capacitor portion corresponds to the semi-light-transmitting portion of the multi-tone mask; therefore, the intensity of the ultraviolet rays is reduced. Accordingly, since the ultraviolet rays do not reach the bottom of the organic resin material, the photo sensitizer is not changed at the bottom of the organic resin material. Since the planarization film 216 above a portion except the above corresponds to the light-blocking portion of the multi-tone mask, the photo-sensitizer contained in the organic resin material does not change.

After that, by development, a portion containing a photo-sensitizer with a high solubility ratio by irradiation with ultraviolet rays is removed with an organic alkali solution. Thus, in the opening 220, the planarization film 216 is completely removed and part of the passivation film 215 is exposed. In the recessed portion 221, the planarization film 216 having a certain thickness remains over the passivation film 215.

Next, the passivation film 215 which is exposed in the opening 220 is removed by etching to form an opening 222. At this time, since the planarization film 216 remains in the recessed portion 221, the passivation film 215 in the recessed portion 221 is not removed (see FIG. 9A).

Next, the planarization film 216 which remains in the recessed portion 221 is removed by ashing treatment to form an opening 218. At this time, by isotropic ashing treatment using oxygen gas plasma or the like, the planarization film 216 is removed also in the lateral direction. Therefore, the opening 222 is slightly widened, so that an opening 217 having a step shape from the passivation film 215 to the planarization film 216 is formed (see FIG. 9B).

The planarization film 216 on which photolithography has been performed using the multi-tone mask as a light-exposure mask has a shape with a plurality of thicknesses. The shape of the planarization film 216 can be further changed by ashing. Accordingly, the planarization film 216 having at least two kinds or more of different patterns can be formed by one multi-tone mask. Thus, the number of light-exposure masks can be reduced and the number of corresponding photolithography steps can be also reduced, whereby simplification of a process and reduction in cost can be realized. Thus, a display device with high quality such as high image quality or high aperture ratio can be produced at low cost.

Figure 9A:
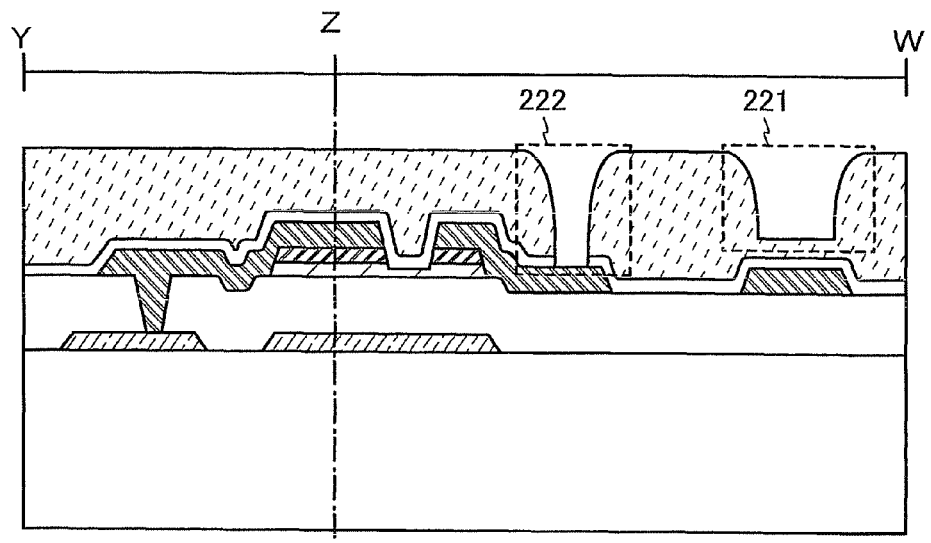
FIGS. 9A to 9C are views illustrating a method for manufacturing a display device according to one embodiment of the present invention.
Figure 9B:
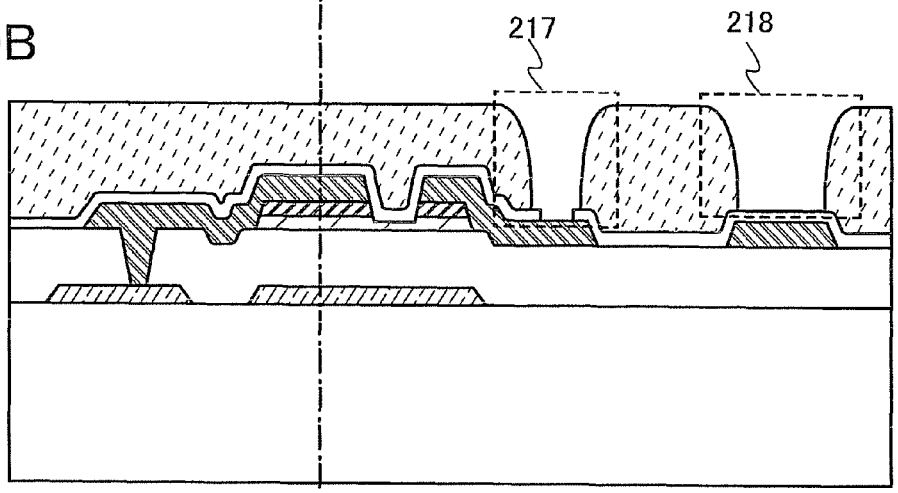
Figure 9C:
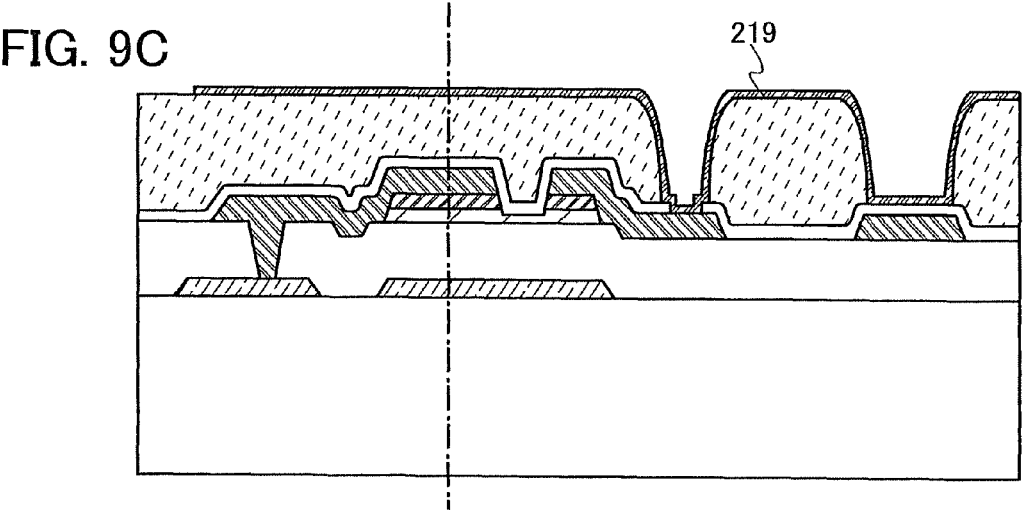

Finally, a light-transmitting conductive film is formed over the planarization film 216, the opening 217 and the opening 218 and patterned into a shape of the pixel electrode 219 (see FIG. 9C).

As the light-transmitting conductive film, a conductive material having a light-transmitting property can be used, such as indium oxide which includes tungsten oxide, indium zinc oxide which includes tungsten oxide, indium oxide which includes titanium oxide, indium tin oxide which includes titanium oxide, indium tin oxide, indium zinc oxide, or indium tin oxide to which silicon oxide is added.

Further, the light-transmitting conductive film can be formed using a conductive composition including a conductive macromolecule (also referred to as a conductive polymer). Sheet resistance of the light-transmitting conductive film formed using a conductive composition is preferably less than or equal to 10000 $\Omega$/square and light transmittance thereof is preferably greater than or equal to 70% at a wavelength of 550 nm. Further, the resistance of the conductive macromolecule included in the conductive composition is preferably less than or equal to 0.1 $\Omega \cdot$cm.

As the conductive macromolecule, a so-called $\pi$-electron conjugated conductive macromolecule can be used. As examples thereof, polyaniline or a derivative thereof, polypyrrole or a derivative thereof, polythiophene or a derivative thereof, a copolymer of more than two kinds of them, and the like can be given.

Through the above-described process, an inverted staggered thin film transistor with a channel-etched structure of this embodiment is manufactured.

By employing the structure of this embodiment, only the passivation film is used as a dielectric film of the auxiliary capacitor portion; therefore, the thickness of the dielectric film can be small. Thus, the area of the auxiliary capacitor portion can be small, so that the aperture ratio of the pixel portion can be improved.

Further, connection of the data signal line through the opening is not made and the data signal line can be formed using one conductive film without connection through an opening, so that signal delay due to contact resistance does not occur. Accordingly, wiring delay of a data signal can be reduced, so that a large display device with especially high quality can be manufactured. Further, if a contact failure occurs in the data signal line, not a line defect but a point defect occurs. Therefore, a defect of a displayed image is not easily recognized, which leads to improvement in image quality and reliability. Further, yield is improved in tennis of mass production.

Further, the pixel electrode is formed over the planarization film and there exist no extra electrodes between the pixel electrode and a counter electrode which are included in a pixel electric capacitance portion; therefore, electric filed is applied to the liquid crystal uniformly, so that the image quality is improved.

Further, by using the planarization film, the pixel electrode which is provided as an uppermost layer is formed to be planar without being affected by the uneven shape of a structural object in a lower layer than the pixel electrode, so that orientation disorder of liquid crystal molecules due to the uneven shape is suppressed and the orientation of the liquid crystal molecules can be controlled ideally. Therefore, image display with high quality is possible. Further, since provision of the planarization film makes it possible to significantly reduce parasitic capacitance between the pixel electrode and the data signal line and between the pixel electrode and the scan signal line, the peripheral edge portion of the pixel electrode can overlap with the data signal line and the scan signal line, so that higher aperture ratio of the pixel can be realized.

Photolithography is performed on the planarization film using the multi-tone mask, whereby a display device can be manufactured without increasing the number of the photomasks. Thus, by reduction in the number of photomasks, a photolithography process can be simplified and increase in manufacturing cost can be suppressed. Thus, the display device with high quality such as high image quality or high aperture ratio can be produced at low cost.

In the present invention, the display device includes a display element. As described in this embodiment, the liquid crystal element (liquid crystal display element) is suitably used as the display element. Further, a light-emitting element (EL element), in which a layer including an organic substance, an inorganic substance, or a compound thereof that perform light-emission referred to as electroluminescence (hereinafter, also referred to as "EL") is interposed between electrodes, may be used. Further, a display medium whose contrast is changed by an electric effect, such as an electronic ink, can be used. Note that a display device using the EL element refers to an EL display, and a display device using a liquid crystal element refers to a liquid crystal display, a transmissive liquid crystal display, a semi-transmissive liquid crystal display. A display device using electronic ink refers to an electronic paper.

In addition, the display device includes a panel in which a display element is sealed, and a module in which an IC and the like including a controller are mounted on the panel. The present invention further relates to one mode of an element substrate before the display element is completed in a manufacturing process of the display device, and the element substrate is provided with a means for supplying current to the display element in each of a plurality of pixels. As for the element substrate, specifically, only a pixel electrode layer of the display element is formed, or a conductive film to be a pixel electrode layer has been deposited and the conductive film is not etched yet to form a pixel electrode layer. Alternatively, any other mode may be applied to the element substrate.

A display device in this specification means an image display device, a display device, or a light source (including a lighting device). Further, the display device includes any of the following modules in its category: a module including a connector such as an flexible printed circuit (FPC), tape automated bonding (TAB) tape, or a tape carrier package (TCP); a module having TAB tape or a TCP which is provided with a printed wiring board at the end thereof; and a module having an integrated circuit (IC) which is directly mounted on a display element by a chip on glass (COG) method.

Embodiment 2

An example in which the shape of a thin film transistor is different from that of Embodiment 1 will be described in this embodiment. Except the shape, the thin film transistor can be formed in a similar manner to Embodiment 1; thus, repetitive description of the same components or components having similar functions as in Embodiment 1 and manufacturing steps for forming those components will be omitted.

Figure 11:
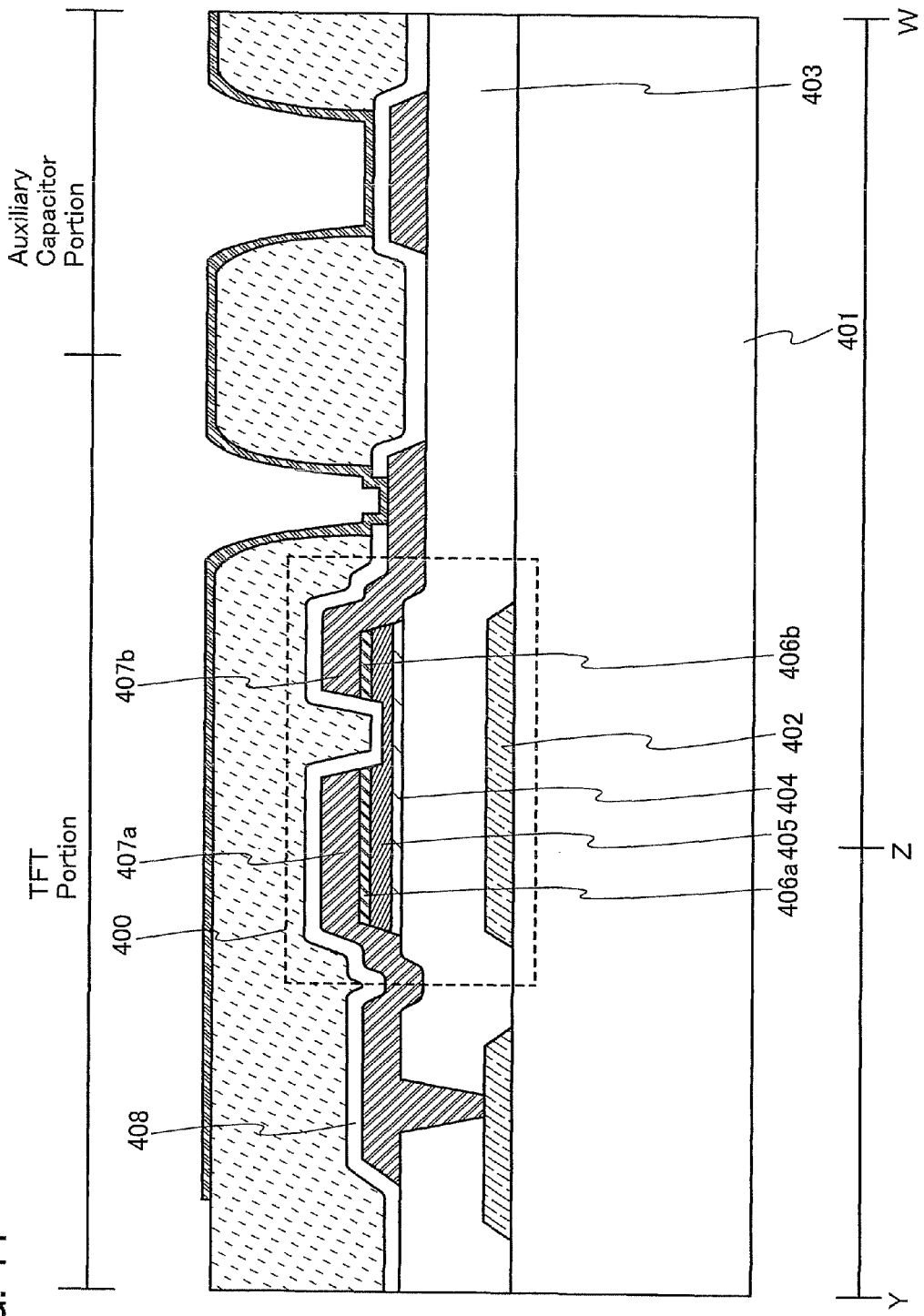
FIG. 11 is a cross-sectional view of a display device according to one embodiment of the present invention.

FIG. 11 illustrates a thin film transistor 400 of this embodiment, which is an inversed staggered thin film transistor with a channel-etched structure.

In FIG. 11, over a substrate 401, a thin film transistor 400 is provided which includes a gate electrode 402, a gate insulating film 403, a microcrystalline semiconductor film 404, a buffer layer 405, an impurity semiconductor film 406a and an impurity semiconductor film 406b, to which an impurity element imparting one conductivity type is added, a source or drain electrode 407a and a source or drain electrode 407b, and a passivation film 408 is provided so as to cover the thin film transistor 400.

In this embodiment, the microcrystalline semiconductor film 404 is used instead of the semiconductor film formed using amorphous silicon in Embodiment 1. In addition, the buffer layer 405 is formed between the microcrystalline semiconductor film 404, and the impurity semiconductor film 406a and the impurity semiconductor film 406b, to which an impurity element imparting one conductivity type is added.

The steps of forming and etching the microcrystalline semiconductor film 404, the buffer layer 405, and the impurity semiconductor film 406a and the impurity semiconductor film 406b, to which an impurity element imparting one conductivity type is added, are performed in a similar manner to those of forming and etching the semiconductor film 209, and the impurity semiconductor film 210a and the impurity semiconductor film 210b, to which an impurity element imparting one conductivity type is added, in Embodiment 1.

The buffer layer 405 is provided over the microcrystalline semiconductor film 404, whereby damage to the microcrystalline semiconductor film 404, which is caused in manufacturing process (reduction in film thickness due to radical by plasma or etchant in etching, oxidation, or the like), can be prevented. Therefore, reliability of the thin film transistor 400 can be improved.

The microcrystalline semiconductor film 404 may be formed over the surface of the gate insulating film 403 on which hydrogen plasma treatment has been performed. By forming the microcrystalline semiconductor film 404 over the gate insulating film 403 which has been affected by hydrogen plasma, crystal growth of microcrystals can be promoted. In addition, lattice distortion at the interface between the gate insulating film 403 and the microcrystalline semiconductor film 404 can be decreased, and interface characteristics of the gate insulating film 403 and the microcrystalline semiconductor film 404 can be improved. Therefore, the resulting microcrystalline semiconductor film 404 can have high electric characteristics and high reliability.

The gate insulating film 403, the microcrystalline semiconductor film 404, the buffer layer 405, and the impurity semiconductor film 406a and the impurity semiconductor film 406b, to which an impurity element imparting one conductivity type is added, may be formed in one reaction chamber, or different reaction chambers according to the kind of each film.

Before a substrate is carried into a reaction chamber to perform film formation, it is preferable to perform cleaning, flush (washing) treatment (hydrogen flush using hydrogen as a flush substance, silane flush using silane as a flush substance, or the like), and coating by which the inner wall of each reaction chamber is coated with a protective film (the coating is also referred to as pre-coating treatment). The pre-coating treatment is treatment in which plasma treatment is performed by making a deposition gas flow in a reaction chamber to thinly coat the inside of the reaction chamber in advance with a protective film which is to be formed. By the flush treatment and the pre-coating treatment, a film to be formed can be prevented from being contaminated by an impurity such as oxygen, nitrogen, or fluorine in the reaction chamber.

Note that the gate insulating film 403, the microcrystalline semiconductor film 404, the buffer layer 405, the impurity semiconductor film 406a and the impurity semiconductor film 406b, to which an impurity element imparting one conductivity type is added, may be formed successively without being exposed to the atmosphere. By depositing successively the gate insulating film 403, the microcrystalline semiconductor film 404, the buffer layer 405, the impurity semiconductor film 406a and the impurity semiconductor film 406b, to which an impurity element imparting one conductivity type is added, without being exposed to the atmosphere, each interface between the stacked layers can be formed without being contaminated by atmospheric components or contaminating impurities contained in the atmosphere. Thus, variations in the characteristics of thin film transistors can be reduced.

As an example of a three-layer structure of the gate insulating film 403, over the gate electrode 402, a silicon nitride film or a silicon nitride oxide film is formed as a first layer, a silicon oxynitride film is formed as a second layer, and a silicon nitride film is formed as a third layer. The microcrystalline semiconductor film may be formed over the silicon nitride film that is a top layer of the gate insulating film 403. In this case, the silicon nitride film or the silicon nitride oxide film as the first layer is preferably thicker than 50 nm and has an effect as a barrier which blocks impurities such as sodium, an effect of preventing a hillock of the gate electrode, an effect of preventing oxidation of the gate electrode, and the like. The silicon nitride film as the third layer has an effect of improving adherence of the microcrystalline semiconductor film and an effect of preventing oxidation in LP treatment in which the microcrystalline semiconductor film is irradiated with a laser beam.

When a nitride film such as a silicon nitride film which is very thin is formed over the surface of the gate insulating film 403 in this manner, adherence of the microcrystalline semiconductor film 404 can be improved. The nitride film may be formed by a plasma CVD method, or by nitridation treatment that is treatment with plasma which is generated by microwaves and has high density and low temperature. In addition, the silicon nitride film or the silicon nitride oxide film may also be formed when a reaction chamber is subjected to silane flush treatment.

Further, the microcrystalline semiconductor film 404 has weak n-type conductivity when an impurity element for controlling valence electrons is not added intentionally. The threshold value of the thin film transistor 400 can be controlled by adding an impurity element imparting p-type conductivity to the microcrystalline semiconductor film 404 functioning as a channel formation region at the same time as or after formation of the microcrystalline semiconductor film 404. A typical example of the impurity element imparting p-type conductivity is boron; and an impurity gas such as $B_2H_6$ or $BF_3$ may be added to silicon hydride at 1 ppm to 1000 ppm, preferably, 1 ppm to 100 ppm. The concentration of boron is preferably set at $1\times10^{14}$ atoms/cm$^3$ to $6\times10^{16}$ atoms/cm$^3$, for example.

The microcrystalline semiconductor film 404 is a film which contains a semiconductor having an intermediate structure between amorphous and crystalline structures (including a single crystal and a polycrystal). This semiconductor is a semiconductor which has a third state that is stable in terms of free energy, and is a crystalline semiconductor which has, short-range order and lattice distortion, and column-like or needle-like crystals with a grain size, seen from the film surface, of 0.5 nm to 20 nm are grown in a normal direction with respect to the surface of the substrate. In addition, a microcrystalline semiconductor and a non-single-crystal semiconductor are mixed. In microcrystalline silicon which is a typical example of microcrystalline semiconductors, its Raman spectrum is shifted to a lower wavenumber side than 521 cm-1 which represents single crystal silicon. That is, the peak of a Raman spectrum of microcrystalline silicon exists between 521 cm-1 that represents single crystal silicon and 480 cm-1 that represents amorphous silicon. The semiconductor includes hydrogen or halogen of at least 1 at. % in order to terminate a dangling bond. Moreover, a rare gas element such as helium, argon, krypton, or neon may be included to further promote lattice distortion, so that stability is enhanced and a favorable microcrystalline semiconductor film can be obtained. Such description about a microcrystalline semiconductor film is disclosed in, for example, U.S. Pat. No. 4,409,134.

The microcrystalline semiconductor film 404 can be formed by a high-frequency plasma CVD apparatus with a frequency of several tens to several hundreds of megahertz or a microwave plasma CVD apparatus with a frequency of 1 GHz or more. The microcrystalline semiconductor film 404 can be typically formed by a dilution of a silicon gas (a silicon hydride gas or a silicon halide gas) such as $SiH_4$, $Si_2H_6$, $SiH_2Cl_2$, $SiHCl_3$, $SiCl_4$, or $SiF_4$ with hydrogen. With a dilution with one or plural kinds of rare gas elements selected from helium, argon, krypton, and neon in addition to a silicon gas and hydrogen, the microcrystalline semiconductor film can be formed. The flow rate of hydrogen to silicon hydride is set to be 5:1 to 200:1, preferably, 50:1 to 150:1, and more preferably, 100:1.

Preferably, the microcrystalline semiconductor film 404 contains oxygen at a concentration of less than or equal to $5\times10^{19}$ atoms/cm$^3$, and more preferably, less than or equal to $1\times10^{19}$ atoms/cm$^3$, and nitrogen and carbon each at a concentration of less than or equal to $1\times10^{18}$ atoms/cm$^3$. By decreases in concentrations of oxygen, nitrogen, and carbon mixed in the microcrystalline semiconductor film, the microcrystalline semiconductor film 404 can be prevented from having an n-type conductivity.

The microcrystalline semiconductor film 404 is formed with a thickness of more than 0 nm and less than or equal to 50 nm, preferably more than 0 nm and less than or equal to 20 nm.

The microcrystalline semiconductor film 404 functions as a channel formation region of the thin film transistor 400 to be formed later. When the microcrystalline semiconductor film 404 is formed to a thickness within the above-described range, the thin film transistor 400 to be formed later is a fully depleted type. Furthermore, because the microcrystalline semiconductor film contains microcrystals, it has a lower resistance than an amorphous semiconductor film. Therefore, the curve representing current-voltage characteristics of a thin film transistor using the microcrystalline semiconductor film is steep in a rising portion, and the thin film transistor has an excellent response as a switching element and can operate at high speed. When the microcrystalline semiconductor film 404 is used for the channel formation region of the thin film transistor 400, fluctuation in the threshold voltage of the thin film transistor 400 can be suppressed. Therefore, a display device with less variation of electrical characteristics can be manufactured.

The microcrystalline semiconductor film has a higher mobility than an amorphous semiconductor film. Therefore, if the thin film transistor 400 in which a channel formation region is formed using the microcrystalline semiconductor film 404 is used as a switching element of a display element, the area of the channel formation region can be reduced; in other words, the area of the thin film transistor 400 can be reduced. Thus, the area of the thin film transistor 400 in each pixel is reduced, whereby the aperture ratio of the pixel can be increased. Accordingly, a device with high resolution can be manufactured.

The microcrystalline semiconductor film has a needle-like crystal which has grown longitudinally from the lower side. The microcrystalline semiconductor film has a mixed structure of amorphous and crystalline structures, and it is likely that a crack is generated and a gap is formed between the crystalline region and the amorphous region due to local stress. A new radical may be interposed into this gap and cause crystal growth. Because the upper crystal face is larger, crystal is likely to grow upward into a needle shape. Even if the microcrystalline semiconductor film grows longitudinally as described above, the growth rate is a tenth to a hundredth of the film formation rate of an amorphous semiconductor film.

The buffer layer 405 which is an amorphous semiconductor film can be formed by a plasma CVD method using a silicon gas (a silicon hydride gas or a silicon halide gas) such as $SiH_4$, $Si_2H_6$, $SiH_2Cl_2$, $SiHCl_3$, $SiCl_4$, or $SiF_4$. Further, the buffer layer 405 which is an amorphous semiconductor film can be formed by diluting the silicon gas with one or plural kinds of rare gas elements selected from helium, argon, krypton, or neon. The buffer layer 405 which is an amorphous semiconductor film containing hydrogen can also be formed using hydrogen with a flow rate greater than or equal to 1 time and less than or equal to 20 times, preferably greater than or equal to 1 time and less than or equal to 10 times, and more preferably greater than or equal to 1 time and less than or equal to 5 times as high as that of silicon hydride. Alternatively, the buffer layer 405 which is an amorphous semiconductor film containing nitrogen can be formed using the silicon gas and nitrogen or ammonia. Further, the buffer layer 405 which is an amorphous semiconductor film including fluorine, chlorine, bromine, or iodine can also be formed using the above silicon gas, and a gas including fluorine, chlorine, bromine, or iodine (e.g., $F_2$, $Cl_2$, $Br_2$, $I_2$, HF, HCl, HBr, or HI).

Alternatively, the buffer layer 405 can be formed as an amorphous semiconductor film by sputtering an amorphous semiconductor as a target with hydrogen or a rare gas. At this time, the buffer layer 405 which is an amorphous semiconductor film including nitrogen can be formed when the atmosphere includes ammonia, nitrogen, or $N_2O$. Alternatively, by inclusion of a gas including fluorine, chlorine, bromine, or iodine ($F_2$, $Cl_2$, $Br_2$, $I_2$, HF, HCl, HBr, HI, or the like) in an atmosphere, the buffer layer 405 which is an amorphous semiconductor film containing fluorine, chlorine, bromine, or iodine can be formed.

Still alternatively, as the buffer layer 405, an amorphous semiconductor film is formed on a surface of the microcrystalline semiconductor film by a plasma CVD method or a sputtering method, and then by hydrogenation, nitridation, or halogenation of the surface of the amorphous semiconductor film through processing of the surface of the amorphous semiconductor film with hydrogen plasma, nitrogen plasma, halogen plasma, or plasma of a rare gas (helium, argon, krypton, or neon).

The buffer layer 405 is preferably formed using an amorphous semiconductor film. Therefore, when the buffer layer 405 is formed by a microwave plasma CVD method or a high-frequency plasma method with a frequency of several tens to several hundreds of megahertz, formation conditions are preferably controlled so that an amorphous semiconductor film can be obtained.

Typically, the buffer layer 405 is preferably formed with a thickness of greater than or equal to 10 nm and less than or equal to 50 nm. The total concentration of nitrogen, carbon, and oxygen contained in the buffer layer is preferably set at $1 \times 10^{20}$ atoms/cm$^3$ to $15 \times 10^{20}$ atoms/cm$^3$. With this concentration, the buffer layer with a thickness of greater than or equal to 10 nm and less than or equal to 50 nm can also function as a high-resistance region.

Alternatively, the buffer layer 405 may be formed with a thickness of greater than or equal to 150 nm and less than or equal to 200 nm, and the concentration of each of carbon, nitrogen, and oxygen contained in the buffer layer 405 may be set at less than or equal to $3 \times 10^{19}$ atoms/cm$^3$, preferably, less than or equal to $5 \times 10^{18}$ atoms/cm$^3$.

By forming an amorphous semiconductor film or an amorphous semiconductor film including hydrogen, nitrogen, or halogen over the surface of the microcrystalline semiconductor film 404, as a buffer layer 405, the surfaces of crystal grains included in the microcrystalline semiconductor film 404 can be prevented from being naturally oxidized. That is, by formation of the buffer layer 405 over the surface of the microcrystalline semiconductor film 404, the microcrystal grains can be prevented from being oxidized. Since the buffer layer 405 includes hydrogen and/or fluorine, oxygen can be prevented from entering the microcrystalline semiconductor film 404.

The buffer layer 405 is formed using an amorphous semiconductor film or an amorphous semiconductor film containing hydrogen, nitrogen, or halogen, so that the buffer layer 54 has higher resistance than the microcrystalline semiconductor film 404 which functions as a channel formation region. Therefore, in the thin film transistor 400 to be formed later, the buffer layer formed between the source electrode and the drain electrode and the microcrystalline semiconductor film functions as a high-resistant region. Accordingly, the off current of the thin film transistor can be reduced. When the thin film transistor is used as a switching element of a display device, the contrast of the display device can be improved.

The end portions of the microcrystalline semiconductor film 404, the buffer layer 405, the impurity semiconductor film 406a and the impurity semiconductor film 406b, to which an impurity element imparting one conductivity type is added, are etched to have a tapered shape. Thus, the impurity semiconductor film 406a and the impurity semiconductor film 406b, to which an impurity element imparting one conductivity type is added, and the microcrystalline semiconductor film 404 can be prevented from being directly in contact with each other. The taper angle of the end portions is 30° to 90°, preferably 45° to 80°. Accordingly, the distance between the impurity semiconductor film 406a and the impurity semiconductor film 406b, to which an impurity element imparting one conductivity type is added, and the microcrystalline semiconductor film 404 can be increased and leakage current can be prevented from being generated. In addition, disconnection of a wiring due to a step shape can be prevented.

The buffer layer 405 is a continuous film in which a buffer layer below the impurity semiconductor film 406a and the impurity semiconductor film 406b, to which an impurity element imparting one conductivity type is added, and a buffer layer over the channel formation region which is the microcrystalline semiconductor film 404 are formed at the same time using the same material. The buffer layer over the microcrystalline semiconductor film 404 blocks external air and an etching residue with hydrogen contained therein and protects the microcrystalline semiconductor film 404.

The buffer layer 405 which does not include an impurity imparting one conductivity type is provided, whereby the impurity imparting one conductivity type, which is included in the impurity semiconductor film 406a and the impurity semiconductor film 406b, to which an impurity element imparting one conductivity type is added, and an impurity imparting one conductivity type, which is used for controlling the threshold voltage of the microcrystalline semiconductor film 404, can be prevented from being mixed with each other. When impurities each imparting one conductivity type are mixed with each other, a recombination center is generated, which leads to flow of leakage current and loss of the effect of reducing off current.

By provision of the buffer layer 405 as described above, a thin film transistor with high withstand voltage, in which leakage current is reduced, can be manufactured. Accordingly, the thin film transistor has high reliability and can be suitably used for a liquid crystal display device where a voltage of 15 V is applied.

By formation of a channel formation region with a microcrystalline semiconductor film, a field-effect mobility of 1 cm$^2$/V·sec to 20 cm$^2$/V·sec can be achieved. Accordingly, this thin film transistor can be used as a switching element of a pixel in a pixel portion and as an element included in a scan line (gate line) side driver circuit.

According to this embodiment, a highly-reliable display device which has a pixel with a high aperture ratio can be manufactured. Further, by reducing the number of light-exposure masks, a photolithography process is simplified, whereby a highly-reliable display device can be manufactured at low cost with high productivity.

Embodiment 3

In this embodiment, an example of a manufacturing process of Embodiment 2, in which a microcrystalline semiconductor film is irradiated with laser light, will be described.

In the case where the microcrystalline semiconductor film is formed over the gate insulating film by a plasma CVD method or the like, near the interface between the gate insulating film and a semiconductor film which contains crystals, a region which contains more amorphous components than crystalline components (here such a region is referred to as an interface region) is formed in some cases. In addition, in the case where an ultra-thin microcrystalline semiconductor film with a thickness of about less than or equal to 10 nm is formed by a plasma CVD method or the like, although a semiconductor film which contains microcrystal grains can be formed, it is difficult to obtain a semiconductor film which contains microcrystal grains which has high quality uniformly throughout the film. In these cases, a laser process for irradiation with laser light to be described below is effective.

First, a gate electrode is formed over a light-transmitting substrate, and a gate insulating film is formed to cover the gate electrode. Then, a microcrystalline silicon (SAS) film is formed as a microcrystalline semiconductor film over the gate insulating film. The thickness of the microcrystalline semiconductor film is greater than or equal to 1 nm and less than 15 nm, preferably greater than or equal to 2 nm and less than or equal to 10 nm. In particular, the microcrystalline semiconductor film with a thickness of 5 nm (4 nm to 8 nm) has high absorptance with respect to laser light and improves productivity.

Next, the microcrystalline silicon film is irradiated with laser light from the surface side. The irradiation is performed with such energy that the laser light does not melt the microcrystalline silicon film. That is, this laser process (hereinafter, also referred to as "LP") of this embodiment involves solid-phase crystal growth which is performed by radiation heating without the microcrystalline silicon film being melted. That is, the process utilizes a critical region where a deposited microcrystalline silicon film is not brought into a liquid phase, and in that sense, the process can also be referred to as "critical growth".

The laser light can affect a region to the interface between the microcrystalline silicon film and the gate insulating film. Accordingly, using the crystals on the surface side of the microcrystalline silicon film as nuclei, solid-phase crystal growth advances from the surface toward the interface with the gate insulating film, and roughly columnar crystals grow. The solid-phase crystal growth by the LP process is not to increase the size of crystal grains but rather to improve crystallinity in a film thickness direction.

In the LP process, for example, a microcrystalline silicon film over a glass substrate of 730 mm×920 mm can be processed by a single laser light scan, by collecting laser light into a long rectangular shape (linear laser light). In such a case, an overlap rate of the linear laser light is set to be from 0% to 90% (preferably from 0% to 67%). Accordingly, the length of processing time for each substrate can be shortened, and productivity can be increased. The shape of the laser light is not limited to a linear shape, and similar processing can be conducted using planar laser light. Further, the LP can be applied to substrates with various sizes without limitation to the above size of the glass substrate.

The LP process has effects in improving crystallinity of an interface region with the gate insulating film and improving electric characteristics of a thin film transistor having a bottom gate structure like the thin film transistor of this embodiment.

Such critical growth also has a feature in that unevenness (a projection called a ridge), which is observed on the surface of conventional low-temperature polysilicon, is not formed and the smoothness of silicon surface is maintained even after the LP process.

A crystalline silicon film that is obtained by the action of the laser light directly on the microcrystalline silicon film as deposited in this embodiment is distinctly different in growth mechanism and film quality from a conventional microcrystalline silicon film as deposited and a microcrystalline silicon film which is modified by conduction heating. In this specification, a crystalline semiconductor film obtained by performing LP treatment on a microcrystalline semiconductor film after the formation is referred to as an LPSAS film.

After the microcrystalline semiconductor film such as an LPSAS film is formed, an amorphous silicon (a-Si:H) film is formed as a buffer layer by a plasma CVD method at temperatures of 300° C. to 400° C. By formation of the amorphous silicon film, hydrogen is supplied to the LPSAS film, and the same effect as in the case of hydrogenation of the LPSAS film can be obtained. In other words, by formation of the amorphous silicon film over the LPSAS film, hydrogen is diffused into the LPSAS film, so that a dangling bond can be terminated.

In the following process, a display device including a thin film transistor is manufactured in similar manner to that in Embodiment 1.

This embodiment can be combined with Embodiment 2 as appropriate.

Embodiment 4

Next, a structure of a display panel, which is one mode of a display device in the present invention disclosed, will be described below. As a display device of this embodiment, an example of a liquid crystal display panel, which is one mode of a liquid crystal display device including a liquid crystal display element, will be described.

Figure 12A:
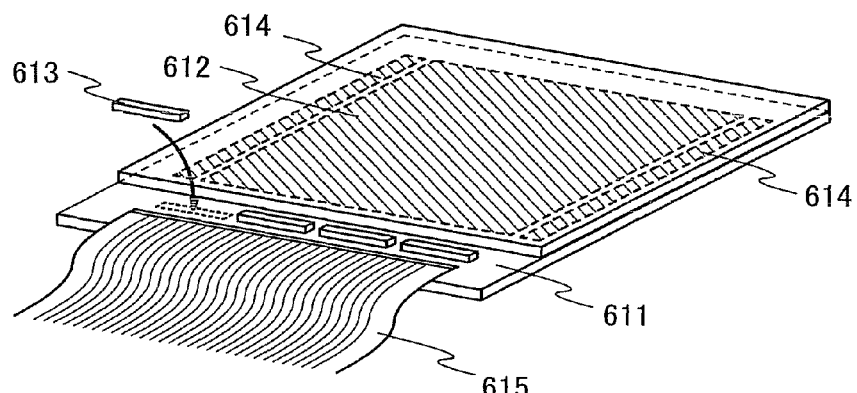
FIGS. 12A to 12C are views each illustrating a display device according to one embodiment of the present invention.
Figure 12B:
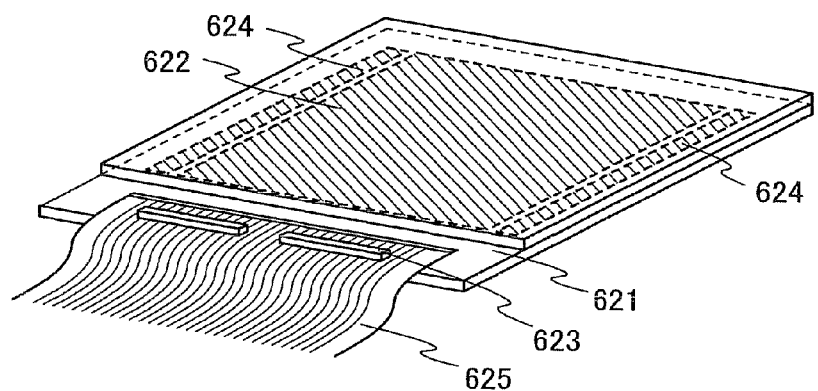
Figure 12C:
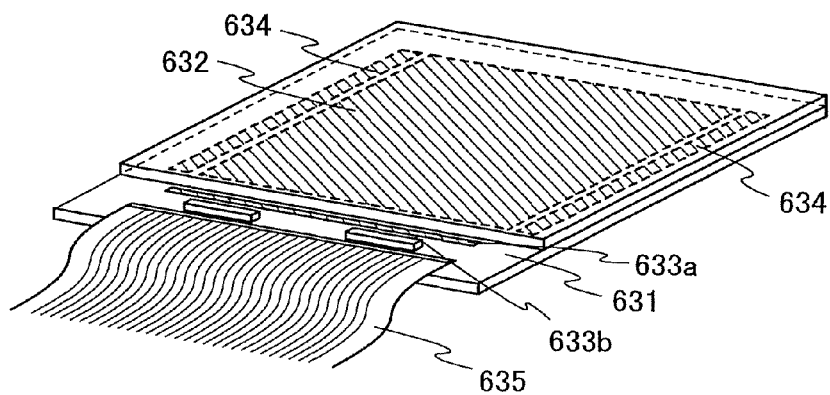

FIG. 12A to 12C illustrate a mode of a display panel in which a signal line driver circuit 613, which is separately formed, is connected to a pixel portion 612 formed over a substrate 611. In this embodiment, the pixel portion 612 and a scan line driver circuit 614 are each formed using a thin film transistor in which an amorphous semiconductor film, a microcrystalline semiconductor film or a polycrystalline semiconductor film is used. When the signal line driver circuit is formed using a transistor which has higher field-effect mobility compared to the thin film transistor using the microcrystalline semiconductor film, an operation of the signal line driver circuit which demands higher driving frequency than that of the scan line driver circuit can be stabilized. Note that the signal line driver circuit 613 may be formed with the use of a transistor using a single crystal semiconductor, a thin film transistor using a polycrystalline semiconductor, or a transistor using SOI. The pixel portion 612, the signal line driver circuit 613, and the scan line driver circuit 614 are each supplied with potential of a power source, a variety of signals, and the like via an FPC 615.

Note that both the signal line driver circuit and the scan line driver circuit may be formed over the same substrate as that of the pixel portion.

Also, when a driver circuit is separately formed, a substrate provided with the driver circuit is not always required to be attached to a substrate provided with the pixel portion, and may be attached to, for example, the FPC. FIG. 12B illustrates a mode of a display panel, in which only a signal line driver circuit 623 is separately formed and connected to a pixel portion 622 and a scan line driver circuit 624 formed over a substrate 621. In this embodiment, the pixel portion 622 and the scan line driver circuit 624 are each formed with the use of a thin film transistor using an amorphous semiconductor film, a microcrystalline semiconductor film, or a polycrystalline semiconductor film. The signal line driver circuit 623 is connected to the pixel portion 622 via an FPC 625. The pixel portion 622, the signal line driver circuit 623, and the scan line driver circuit 624 are each supplied with potential of a power source, a variety of signals, and the like via the FPC 625.

Alternatively, only part of a signal line driver circuit or part of a scan line driver circuit may be formed over the same substrate as that of a pixel portion by using a thin film transistor using an amorphous semiconductor film, a microcrystalline semiconductor film, or a polycrystalline semiconductor film, and the other part of the driver circuit may be separately formed and electrically connected to the pixel portion. FIG. 12C illustrates a mode of a display panel in which an analog switch 633a included in a signal line driver circuit is formed over a substrate 631, over which a pixel portion 632 and a scan line driver circuit 634 are formed, and a shift register 633b included in the signal line driver circuit is formed separately over a different substrate and then attached to the substrate 631. In this embodiment, the pixel portion 632 and the scan line driver circuit 634 are each formed with the use of a thin film transistor using an amorphous semiconductor film, a microcrystalline semiconductor film, or a polycrystalline semiconductor film. The shift register 633b included in the signal line driver circuit is connected to the pixel portion 632 via an FPC 635. The pixel portion 632, the signal line driver circuit, and the scan line driver circuit 634 are each supplied with a potential of a power source, a variety of signals, and the like via the FPC 635.

As illustrated in FIGS. 12A to 12C, in the display device of this embodiment, all or part of the driver circuit can be formed over the same substrate as that of a pixel portion with the use of the thin film transistor in which an amorphous semiconductor film, a microcrystalline semiconductor film or a polycrystalline semiconductor film is used.

Note that there is no particular limitation on a connection method of the substrate formed separately, and a known COG method, a wire bonding method, a TAB method, or the like can be used. Further, a connection position is not limited to the position illustrated in FIGS. 12A to 12C, as long as electrical connection is possible. Alternatively, a controller, a CPU, a memory, and/or the like may be formed separately and connected.

Note that the signal line driver circuit used in the present invention is not limited to a mode including only a shift register and an analog switch. In addition to the shift register and the analog switch, another circuit such as a buffer, a level shifter, or a source follower may be included. Moreover, the shift register and the analog switch are not necessarily provided. For example, a different circuit such as a decoder circuit by which a signal line can be selected may be used instead of the shift register, or a latch or the like may be used instead of the analog switch.

Figure 13A:
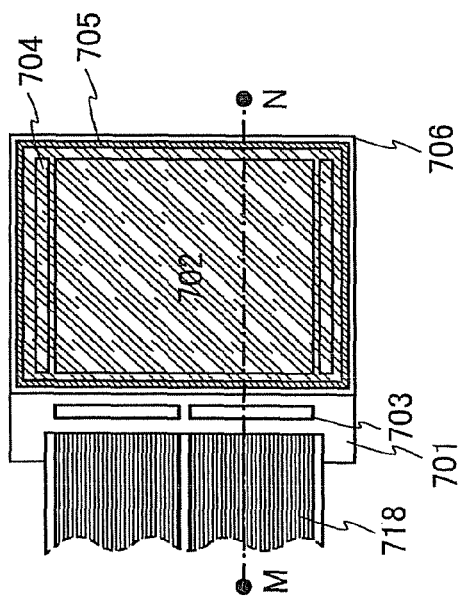
FIGS. 13A and 13B are views illustrating a display device according to one embodiment of the present invention.
Figure 13B:
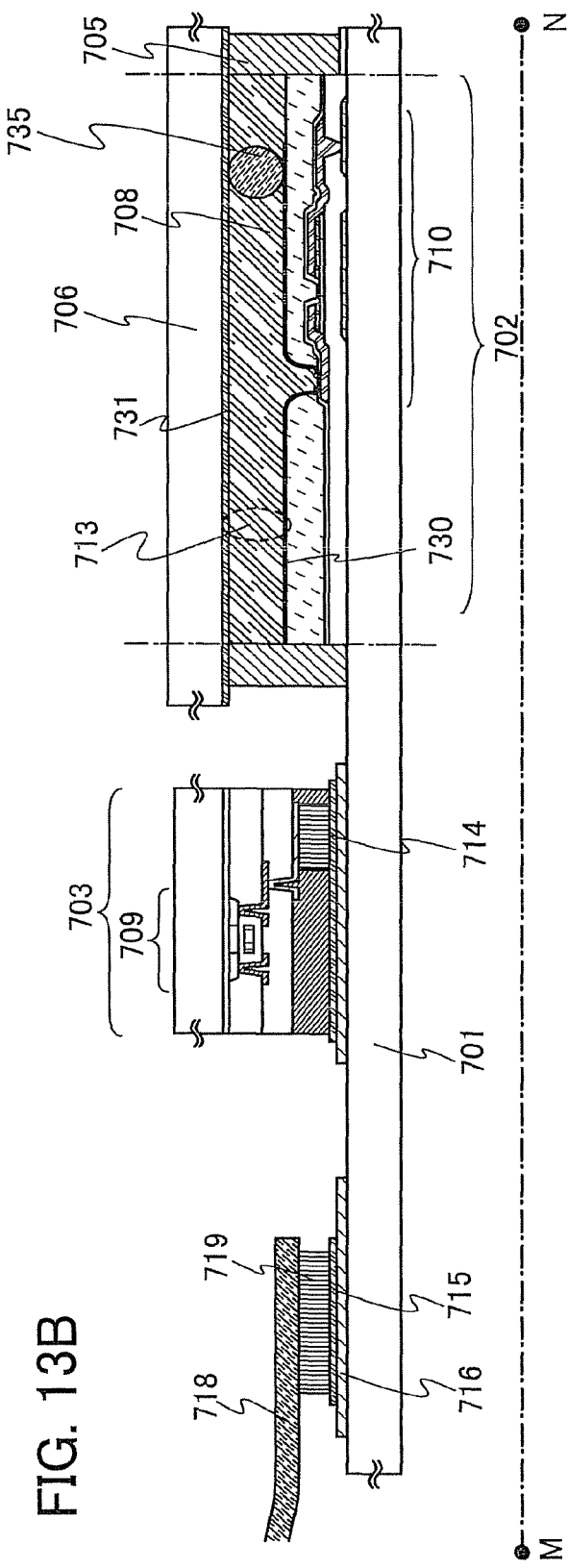

Next, an external view and a cross section of a display panel, which is one mode of the display device of the invention to be disclosed, will be described with reference to FIGS. 13A and 13B. FIG. 13A is a top plan view of a panel. In the panel, a thin film transistor 710 and a liquid crystal element 713, which are formed over a first substrate 701, are sealed between the first substrate 701 and a second substrate 706 by a sealant 705. FIG. 13B corresponds to a cross sectional view taken along a line M-N in FIG. 13A.

The sealant 705 is provided to surround the pixel portion 702 and the scan line driver circuit 704, which are provided over the first substrate 701. The second substrate 706 is provided over the pixel portion 702 and the scan line driver circuit 704. Accordingly, the pixel portion 702 and the scan line driver circuit 704 are sealed together with liquid crystal 708 by the first substrate 701, the sealant 705, and the second substrate 706. A signal line driver circuit 703, which is formed over a substrate prepared separately using a polycrystalline semiconductor film, is mounted at a region different from the region surrounded by the sealant 705 over the first substrate 701. In this embodiment, an example of attaching the signal line driver circuit including a thin film transistor formed using a polycrystalline semiconductor film to the first substrate 701 will be described. Alternatively, a signal line driver circuit including a thin film transistor, which is formed using a single crystal semiconductor, may be attached to the first substrate 701. In FIGS. 13A and 13B, a thin film transistor 709, which is formed using a polycrystalline semiconductor film and included in the signal line driver circuit 703 will be illustrated as an example.

Further, the pixel portion 702 and the scan line driver circuit 704, which are formed over the first substrate 701, each include a plurality of thin film transistors. The thin film transistor 710 included in the pixel portion 702 is illustrated in FIG. 13B. The thin film transistor 710 corresponds to the thin film transistor described in Embodiment 1, which can be formed through the same manufacturing process described in Embodiment 1.

The liquid crystal element 713 and the thin film transistor 710 are electrically connected to each other by a light-transmitting conductive layer 730 functioning as a pixel electrode layer. A counter electrode 731 of the liquid crystal element 713 is formed on the second substrate 706. A part in which the light-transmitting conductive layer 730, the counter electrode 731, and the liquid crystal 708 are overlapped corresponds to the liquid crystal element 713.

Note that as the first substrate 701 and the second substrate 706, glass, ceramics, or plastics can be used. As for plastic, an FRP (fiberglass-reinforced plastics) plate, a PVF (polyvinyl fluoride) film, a polyester film, or an acrylic resin film can be used. In the case of a transmissive liquid crystal display device, the first and second substrates needs to have a light-transmitting property. However, in the case of a semi-transmitting liquid crystal display device, a reflective material may be used for a part which corresponds to a reflective region.

A spherical spacer 735 is provided to control a distance (a cell gap) between the light-transmitting conductive layer 730 and the counter electrode 731. Note that a spacer which is obtained by selective etching of an insulating film may also be used.

A variety of signals and a potential, which are supplied to the signal line driver circuit 703 separately formed, the scan line driver circuit 704, and the pixel portion 702, are supplied from an FPC 718 via wirings 714 and 715.

In this embodiment, a connection terminal 716 is formed using the same conductive film as that of the light-transmitting conductive layer 730 included in the liquid crystal element 713.

The connection terminal 716 is electrically connected to a terminal of an FPC 718 via an anisotropic conductive film 719.

Note that, although not illustrated, the liquid crystal display device described in this embodiment includes an alignment film on the second substrate 706 side, and includes polarizing plates on the first substrate 701 side and the second substrate 706 side. Further, a color filter or a blocking film may be included.

Note that FIGS. 13A and 13B illustrate an example in which the signal line driver circuit 703 is formed separately and mounted on the first substrate 701; however, this embodiment is not limited to this structure. The scan line driver circuit may be separately formed and mounted on the substrate, or only part of the signal line driver circuit or part of the scan line driver circuit may be separately formed and mounted on the substrate.

This embodiment can be implemented as appropriate in combination with any of the structures described in the other embodiments.

According to this embodiment, a highly-reliable display panel having a pixel with a high aperture ratio can be manufactured. Further, a photolithography process is simplified by reducing the number of light-exposure masks, whereby a reliable display panel can be manufactured at low cost with high productivity.

Embodiment 5

A display device obtained by the present invention can be used for a display module. That is, the present invention can be implemented in all types of electronic devices in which the display module is incorporated into a display portion.

As those kinds of electronic devices, cameras such as video cameras and digital cameras; head-mounted displays (goggle type displays); car navigation systems; projectors; car stereos; personal computers; portable information terminals (such as mobile computers, mobile phones, and electronic book readers); and the like can be given. FIGS. 14A to 14D illustrate examples of such electronic devices.

Figure 14A:
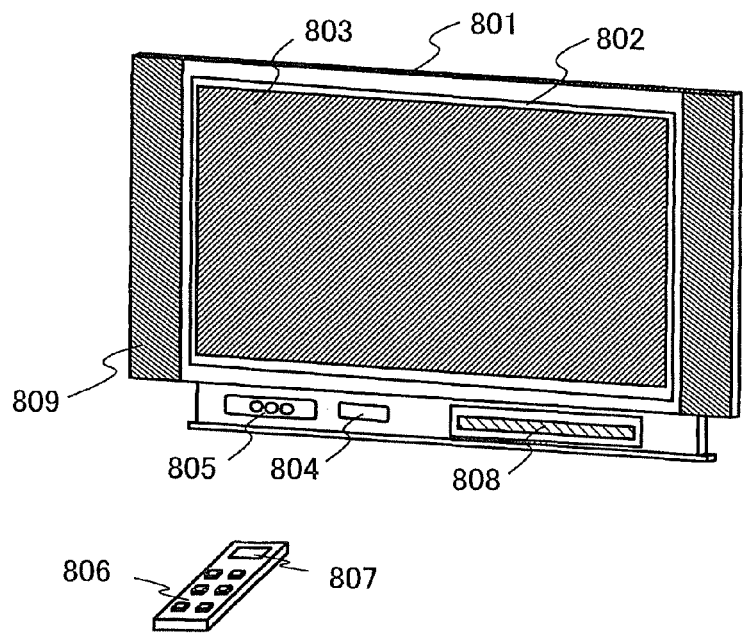
FIGS. 14A and 14D are views each illustrating an electronic device according to one embodiment of the present invention.

FIG. 14A illustrates a television device. The television device can be completed by incorporating a display module into a housing as illustrated in FIG. 14A. A display panel at the stage after an FPC is attached is also referred to as a display module. A main screen 803 is formed using the display module, and a speaker portion 809, operation switches, and the like are provided as its accessory equipment. In such a manner, the television device can be completed.

As illustrated in FIG. 14A, a display panel 802 using a display element is incorporated into a housing 801. The television device can receive general TV broadcast by a receiver 805, and can be connected to a wired or wireless communication network via a modem 804, so that one-way (from a sender to a receiver) or two-way (between a sender and a receiver or between receivers) information communication can be performed. Operations of the television device can be performed using switches that are incorporated into the housing or by a remote control device 806 provided separately, and a display portion 807 that displays information output to this remote control device may be provided for the remote control device 806. By application of the display device described in the above embodiment to the display panel 802, effects such as improvement in reliability due to reduction in wiring delay, improvement in an aperture ratio due to reduction in thickness of the auxiliary capacitor portion, improvement in image quality due to planarization of the pixel electrode, simplification of a photolithography process and reduction in manufacturing cost due to reduction in the number of photomasks, and the like can be obtained. Owing to the above effects, the display device described in the above embodiment is suitable for a large panel used for a liquid crystal television or the like among display panels. When high definition is especially needed, an aperture ratio can be improved by the method described in the above embodiment.

Further, the television device may include a sub-screen 808 formed using a second display panel to display channels, volume, or the like, in addition to the main screen 803.

Figure 15:
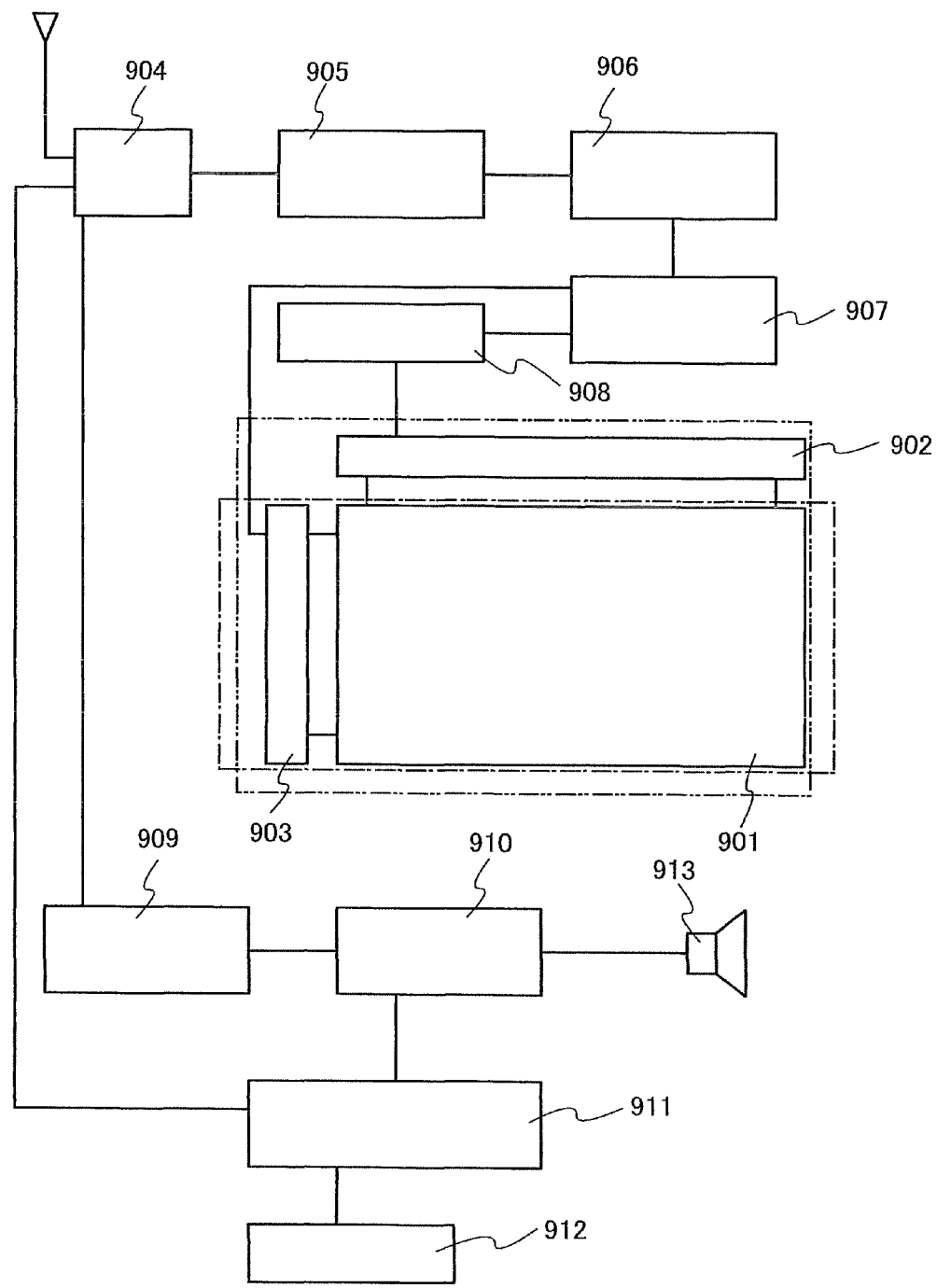
FIG. 15 is a block diagram illustrating a main structure of an electronic device according to one embodiment of the present invention.

FIG. 15 is a block diagram illustrating a main structure of a television device. A pixel portion 901 is formed in a display panel. A signal line driver circuit 902 and a scan line driver circuit 903 may be mounted on the display panel by a COG method.

As for other external circuits, the television device includes a video signal amplifier circuit 905 which amplifies a video signal among signals received by a tuner 904; a video signal processing circuit 906 which converts a signal output from the video signal amplifier circuit 905 into a color signal corresponding to each color of red, green, and blue; a control circuit 907 which converts the video signal into an input specification of a driver IC; and the like. The control circuit 907 outputs a signal to each of the scan line side and the signal line side. In the case of digital drive, a signal dividing circuit 908 may be provided on the signal line side and an input digital signal may be divided into m pieces and supplied.

Audio signals among the signals received at the tuner 904 are transmitted to an audio signal amplifier circuit 909, and an output thereof is supplied to a speaker 913 through an audio signal processing circuit 910. A control circuit 911 receives control information of a receiving station (reception frequency) or sound volume from an input portion 912 and transmits signals to the tuner 904 or the audio signal processing circuit 910.

Needless to say, the present invention is not limited to a television device and can be applied to a variety of uses, such as a monitor of a personal computer, a large display medium such as an information display board at the train station, the airport, or the like, or an advertisement display board on the street.

Figure 14B:
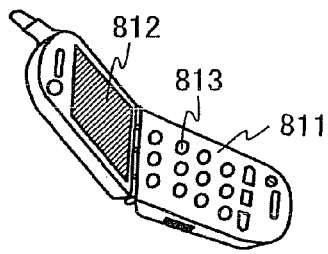

FIG. 14B illustrates an example of a mobile phone 811. The mobile phone 811 includes a display portion 812, an operation portion 813, and the like. The display device described in the above-described embodiment is applied to the display portion 812, whereby improvement in an aperture ratio and reliability of the display device, reduction in cost, and enhancement of mass productivity can be realized.

Figure 14C:
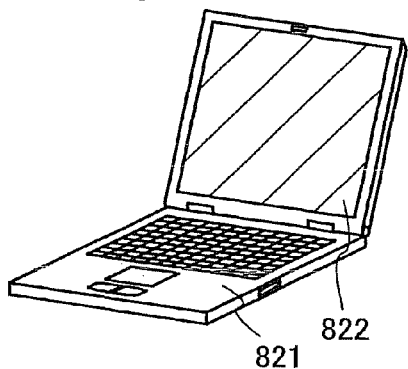

A portable computer illustrated in FIG. 14C includes a main body 821, a display portion 822, and the like. The display device described in the above-described embodiment is applied to the display portion 822, whereby improvement in an aperture ratio and reliability of the display device, reduction in cost and enhancement of mass productivity can be realized.

Figure 14D:
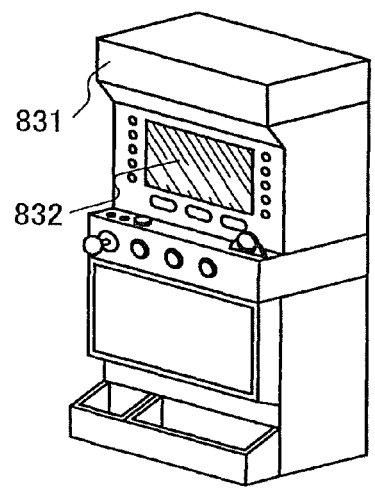

A slot machine illustrated in FIG. 14D, which is an example of a game machine, includes a main body 831, a display portion 832, and the like. The display device described in the above-described embodiment is applied to the display portion 832, whereby improvement in an aperture ratio and reliability of the display device, reduction in cost and enhancement of mass productivity can be realized.

This application is based on Japanese Patent Application serial no. 2008-089241 filed with Japan Patent Office on Mar. 31, 2008, the entire contents of which are hereby incorporated by reference.

What is claimed is:

1. A display device comprising:
   a gate electrode over a light-transmitting substrate, wherein the gate electrode comprises a first conductive material;
   a first line over the light-transmitting substrate, wherein the first line comprises the first conductive material and extends in one direction;
   a first insulating film having a first opening over the gate electrode and the first line;
   a semiconductor film over the first insulating film;
   a source electrode over the first insulating film and the semiconductor film, wherein the source electrode comprises a second conductive material;
   a drain electrode over the first insulating film and the semiconductor film, wherein the drain electrode comprises the second conductive material;
   a conductive film over the first insulating film, the conductive film comprising the second conductive material;
   a second line over the first insulating film, the second line comprising the second conductive material and extends in the direction intersecting with the one direction;
   a second insulating film over the first insulating film, the source electrode and the drain electrode, the conductive film and the second line;
   a third insulating film having a second opening over the second insulating film; and
   a pixel electrode over the third insulating film, the pixel electrode being in contact with a portion of the second insulating film in the second opening; and
   a capacitor overlapping with the second opening, the capacitor comprising the second line, the second insulating film and the pixel electrode,
   wherein one of the source electrode and the drain electrode is electrically connected to the semiconductor film and the first line,
   wherein the other of the source electrode and the drain electrode is electrically connected to the semiconductor film and the pixel electrode,
   wherein the gate electrode is in contact with the conductive film in the first opening.

2. The display device according to claim 1, wherein a peripheral edge portion of the pixel electrode overlaps with the first line and the second line.

3. The display device according to claim 1, wherein the semiconductor film has a portion that is recessed when seen in cross section.

4. The display device according to claim 3, further comprising:
   a first impurity semiconductor film and a second impurity semiconductor film, to which an impurity element imparting one conductivity type is added, over the semiconductor film,
   wherein one of the source electrode and the drain electrode is in contact with the first impurity semiconductor film and the first line; and
   wherein the other of the source electrode and the drain electrode is in contact with the second impurity semiconductor film and the pixel electrode.

5. The display device according to claim 1, wherein the third insulating film comprises a photosensitive organic resin material.

6. The display device according to claim 1, wherein the first line and the second line intersect with each other with the first insulating film interposed therebetween.

7. An electronic device comprising the display device according to claim 1 in a display portion.

8. The display device according to claim 1, wherein the semiconductor film comprises silicon.

9. The display device according to claim 1, further comprising a liquid crystal element.

10. The display device according to claim 1, further comprising a light-emitting element.

11. A display device comprising:
    a gate electrode over a light-transmitting substrate, wherein the gate electrode comprises a first conductive material;
    a first line over the light-transmitting substrate, wherein the first line comprises the first conductive material and extends in one direction;
    a first insulating film having a first opening over the gate electrode and the first line;
    a microcrystalline semiconductor film over the first insulating film;
    a buffer layer over the microcrystalline semiconductor film and has a portion that is recessed when seen in cross section;
    a first impurity semiconductor film and a second impurity semiconductor film, to which an impurity element imparting one conductivity type is added, and which are provided over the buffer layer;
    a source electrode over the first insulating film, the first impurity semiconductor film and the second impurity semiconductor film, wherein the source electrode comprises a second conductive material;
    a drain electrode over the first insulating film, the first impurity semiconductor film and the second impurity semiconductor film, wherein the drain electrode comprises the second conductive material;
    a conductive film over the first insulating film, wherein the conductive film comprises the second conductive material;
    a second line over the first insulating film, wherein the second line comprises the second conductive material and extends in the direction intersecting with the one direction;
    a second insulating film over the first insulating film, the source electrode and the drain electrode, the conductive film and the second line;
    a third insulating film having a second opening over the second insulating film; and
    a pixel electrode over the third insulating film, the pixel electrode being in contact with a portion of the second insulating film in the second opening; and
    a capacitor overlapping with the second opening, the capacitor comprising the second line, the second insulating film and the pixel electrode,
    wherein one of the source electrode and the drain electrode is electrically connected to the first impurity semiconductor film and the first line,
    wherein the other of the source electrode and the drain electrode is electrically connected to the second impurity semiconductor film and the pixel electrode, and
    wherein the gate electrode is in contact with the conductive film in the first opening.

12. The display device according to claim 11, wherein a peripheral edge portion of the pixel electrode overlaps with the first line and the second line.

13. The display device according to claim 11, wherein the third insulating film comprises a photosensitive organic resin material.

14. The display device according to claim 11, wherein the first line and the second line intersect with each other with the first insulating film interposed therebetween.

15. An electronic device comprising the display device according to claim 11 in a display portion.

16. The display device according to claim 11, wherein the microcrystalline semiconductor film comprises silicon.

17. The display device according to claim 11, further comprising a liquid crystal element.

18. The display device according to claim 11, further comprising a light-emitting element.

* * * * *

UNITED STATES PATENT AND TRADEMARK OFFICE
CERTIFICATE OF CORRECTION

PATENT NO. : 8,519,398 B2
APPLICATION NO. : 13/423874
DATED : August 27, 2013
INVENTOR(S) : Kunio Hosoya It is certified that error appears in the above-identified patent and that said Letters Patent is hereby corrected as shown below:

In the Specification:

Column 8, Line 55; Change "are framed in" to --are formed in--.
Column 14, Line 63; Change "preferably limited using" to --preferably formed using--.
Column 18, Line 30; Change "in tennis of" to --in terms of--.

Signed and Sealed this
Tenth Day of December, 2013

Margaret A. Focarino
*Commissioner for Patents of the United States Patent and Trademark Office*